(12) United States Patent
Matsumoto et al.

(10) Patent No.: US 8,761,554 B2
(45) Date of Patent: Jun. 24, 2014

(54) WAVELENGTH SELECTIVE SWITCH

(75) Inventors: Koji Matsumoto, Hachioji (JP); Satoshi Watanabe, Tokyo (JP); Toshiro Okamura, Hino (JP); Takeshi Yamazaki, Hachioji (JP)

(73) Assignee: JDS Uniphase Corporation, Milpitas, CA (US)

(*) Notice: Subject to any disclaimer, the term of this patent is extended or adjusted under 35 U.S.C. 154(b) by 247 days.

(21) Appl. No.: 13/419,646

(22) Filed: Mar. 14, 2012

(65) Prior Publication Data

US 2013/0163921 A1    Jun. 27, 2013

(30) Foreign Application Priority Data

Dec. 27, 2011  (JP) .................................. 2011-286886
Feb. 7, 2012   (JP) .................................. 2012-024425

(51) Int. Cl.
*G02B 6/26* (2006.01)
*G02B 6/42* (2006.01)

(52) U.S. Cl.
USPC .......................................................... 385/16

(58) Field of Classification Search
USPC .......................................................... 385/16
See application file for complete search history.

(56) References Cited

U.S. PATENT DOCUMENTS 7,630,599 B2    12/2009  McLaughlin et al.
2009/0028502 A1*  1/2009  Presley et al. ................... 385/18

* cited by examiner

*Primary Examiner* — Jerry Blevins
(74) *Attorney, Agent, or Firm* — Matthew A. Pequignot; Pequignot + Myers LLC

(57) ABSTRACT

Provided is a wavelength selective switch, which includes: an input/output unit; a dispersive portion; a condensing optical system; and the deflection portion. The input/output unit has input/output ports. The dispersive portion disperses signal light incident from the input/output ports. The condensing optical system condenses a plurality of signal light beams dispersed by the dispersive portion. The deflection portion has a plurality of deflection elements. The deflection elements deflect, along a second direction, the signal light beams condensed by the condensing optical system. In the condensing optical system, the aberration amount of the meridional component in a sagittal coma aberration remains substantially constant irrespective of an angle formed between the optical axis of the condensing optical system and a signal light beam incident on the condensing optical system from the input/output portion, at an incident position of the incident signal light beam at a certain height in the second direction.

14 Claims, 35 Drawing Sheets

WAVELENGTH SELECTIVE SWITCH

CROSS REFERENCE

The present application claims the priority of Japanese Patent Applications Nos. 2011-286886 and 2012-024425 filed on Dec. 27, 2011 and Feb. 7, 2012, respectively, the contents of which are incorporated herein by reference.

TECHNICAL FIELD

The present invention relates to a wavelength selective switch capable of diverging light of different wavelengths.

RELATED ART

Conventionally, there has been known to use a wavelength selective switch having a plurality of input/output ports in wavelength division multiplexing (see U.S. Pat. No. 7,630,599).

SUMMARY OF THE INVENTION

Problems to be Solved by the Invention

A wavelength selective switch is required to have a desired transmission bandwidth; the transmission bandwidth serves as an index of performance of the wavelength selective switch. Along with the recent development of large-scale networks, there are demands for a wavelength selective switch having a wide transmission band and an increased number of input/output ports. However, in a conventional wavelength selective switch, it has been difficult to increase the number of input/output ports to eleven or more without impairing a favorable transmission band.

The present invention has been made in view of the above-mentioned problems, and it is therefore an object of the invention to provide a wavelength selective switch capable of increasing the number of input/output ports than ever before while ensuring a favorable transmission band.

Means for Solving the Problem

In order to solve the above-mentioned problems, a wavelength selective switch according to the present invention includes:

an input/output portion including at least twenty input/output ports;

a dispersive portion for dispersing wavelength-multiplexed signal light incident from the input/output port;

a condensing optical system for condensing a plurality of signal light beams dispersed by the dispersive portion; and a deflection portion having a plurality of deflection elements for deflecting, along a second direction perpendicular to the dispersion direction of the dispersive portion, the plurality of signal light beams condensed by the condensing optical system, so as to allow the signal light beams to be incident on any of the input/output ports, the condensing optical system having the aberration amount of the meridional component in a sagittal coma aberration maintained substantially constant irrespective of an angle formed between the optical axis of the condensing optical system and the signal light beam incident on the condensing optical system from the input/output portion, at an incident position of the incident signal light beam at a certain height in the second direction.

Effect of the Invention

The wavelength selective switch according to the present invention configured as described above is capable of suppressing the light-condensing position shift in the deflection elements even with respect to twenty or more input/output ports, thereby ensuring a favorable transmission band.

DETAILED DESCRIPTION OF THE INVENTION

Figure 1:
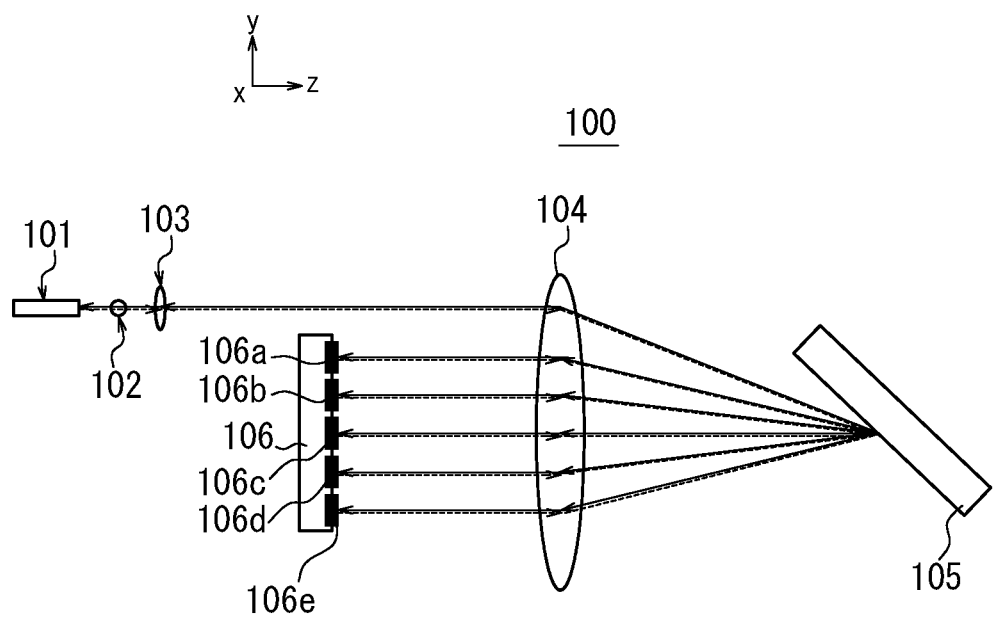
FIG. 1 is a plan view illustrating a schematic configuration of a wavelength selective switch according to a first embodiment of the present invention.
Figure 2:
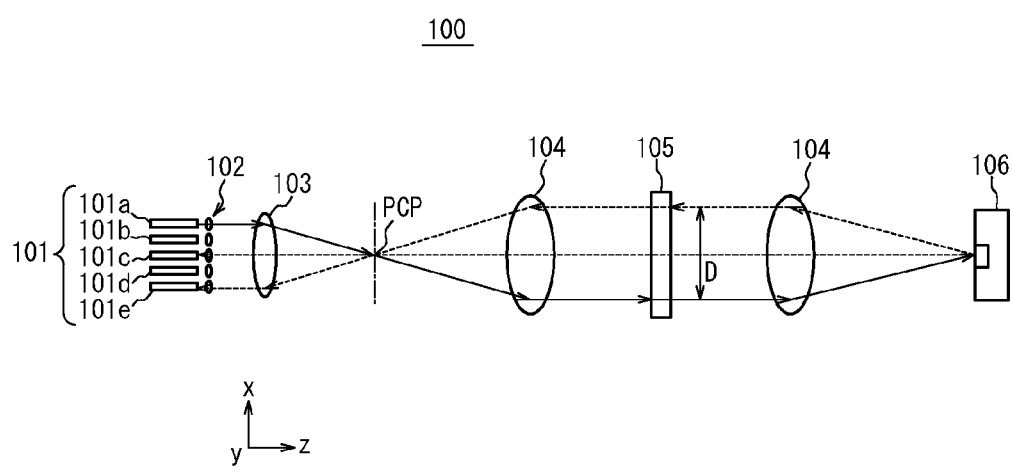
FIG. 2 is a development view of the optical paths of FIG. 1 viewed from the side.

In the following, embodiments of a wavelength selective switch according to a certain aspect of the present invention are described with reference to the drawings. FIG. 1 is a plan view illustrating a schematic configuration of a wavelength selective switch according to a first embodiment of the present invention. FIG. 2 is a development view of the optical paths of FIG. 1 viewed from the side.

A wavelength selective switch 100 is configured by including: an input/output unit 101, a micro lens array 102, a first condenser lens 103, a second condenser lens 104 (condensing optical system), a dispersive portion 105, a deflection portion 16, and so on.

The input/output unit 101 includes at least twenty input/output ports. However, for the sake of convenience in description, FIG. 2 illustrates only five input/output ports 101a to 101e.

The plurality of input/output ports 101a to 101e are arranged so as to have their optical axes parallel to one another. The input/output ports 101a to 101e are, for example, optical fibers, and allow wavelength-multiplexed signal light to be input from outside of the wavelength selective switch 100 and to be output to the outside. One end of each of the optical fibers is arranged inside the wavelength selective switch 100, while the other end thereof is connected to the outside of the wavelength selective switch 100. Signal light is input to at least any one of the input/output ports 101a to 101e.

The input/output unit 101 and the micro lens array 102 are arranged so that the input/output ports 101a to 101e each form a pair with each of the micro lenses in the micro lens array 102. The micro lenses each convert light input from the input/output ports 101a to 101e into parallel light beams, and make the parallel light beams being output to the input/output ports 101a to 101e incident on the optical fibers.

In the following description, the traveling direction of the parallel light beams that have passed through the input/output ports 101a to 101e and the micro lens array 102 is defined as optical axis direction (z direction). This optical axis direction coincides with the optical axis direction of the first condenser lens 103 and second condenser lens 104. The array direction of the input/output ports 101a to 101e and the micro lenses is defined as first direction (x direction). The optical axis direction and the first direction are perpendicular to each other. Further, a direction perpendicular to each of the optical axis direction and the first direction (x direction) is defined as second direction (y direction).

It should be noted that, even if an actual wavelength selective switch has deflection members such as a mirror and a prism disposed in the optical path thereof so as to bend the optical path, the description on the x direction and the y direction is made assuming a virtual optical system that does not include such deflection members.

The first condenser lens 103 condenses signal light output from any of the input/output ports 101a to 101e onto a primary condensing point PCP in the x direction (see FIG. 2). The second condenser lens 104 is disposed in a position where a distance from the primary condensing point PCP to the second condenser lens 104 becomes equal to the focal length of the second condenser lens 104. Therefore, signal light beams that have passed through the primary condensing point PCP to be output from the second condenser lens 104 become parallel to the optical axis of the second condenser lens 104 in the x direction, due to the action of second condenser lens 104.

The dispersive portion 105 is disposed in a position where a distance from the second condenser lens 104 to the dispersive portion 105 becomes equal to the focal length of the second condenser lens 104. The dispersive portion 105 is, for example, a diffraction grating having a grating parallel to the x axis formed on the dispersion plane. The dispersive portion 105 may desirably have high capability to separate light into wavelengths and a large dispersion angle.

As illustrated in FIGS. 1 and 2, signal light beams that have passed through the second condenser lens 104 from the primary condensing point PCP are converted into substantially parallel light beams to be incident on the dispersive portion 105, and then diffracted in the y direction at different angles for each wavelength on the dispersion plane of the dispersive portion 105. In other words, the dispersive portion 105 separates signal light into light beams of different wavelengths which are included in the signal light. For simplicity, FIGS. 1 and 2 each linearly illustrate the optical path in the z direction from the input/output unit 101 leading to the deflection portion 106.

The dispersive portion 105 is designed and disposed so that the incident positions of the signal light beams incident on the second condenser lens 104 after being dispersed by the dispersive portion 105 are closer to the optical axis of the second condenser lens 104 in the y direction, as compared to the incident positions of the signal light beams incident on the second condenser lens 104 after passing through the primary condensing point PCP. Further, the dispersive portion 105 is designed and disposed so that, among the plurality of signal light beams dispersed by the dispersive portion 105, one of the signal light beams overlaps with the optical axis of the second condenser lens 104 in the y direction.

The deflection portion 106 is disposed in a position where a distance from the second condenser lens 104 to the incidence plane of the deflection portion 106 becomes equal to the focal length of the second condenser lens 104. With this configuration, signal light beams dispersed by the dispersive portion 105 into wavelengths are converted by the second condenser lens 104 into convergent light beams parallel to one another, so as to be incident on the incidence plane of the deflection portion 106 substantially at right angles thereto in the y direction.

Further, as illustrated in FIG. 2, signal light that has passed through the primary condensing point PCP is dispersed by the dispersive portion 105, and then condensed at a height position (position in the x direction) where the optical axis of the second condenser lens 104 meets deflection elements 106a to 106e provided to the deflection portion 106 in the yz plane. Therefore, the signal light beams from the input/output ports 101a to 101e are all condensed onto the deflection elements 106a to 106e.

The deflection portion 106 is, for example, a MEMS mirror array, and the deflection elements 106a to 106e include micro mirrors forming the MEMS mirror array. The deflection elements 106a to 106e are arranged in parallel to the y direction in the yz plane including the optical axis of the second condenser lens 104, correspondingly to the wavelengths into which the light is dispersed.

Mirrors serving as the deflection elements 106a to 106e may be controlled independently of one another to be changed in tilt. In particular, the deflection elements 106a to 106e may be changed in tilt relative to the xz plane (see FIG. 2), to thereby reflect the incident light beams in wavelengths, in a height direction different from the incident direction.

The signal light beams in wavelengths reflected by the respective deflection elements 106a to 106e each pass through the second condenser lens 104 to be diffracted by the dispersive portion 105, and travel along an optical path in a direction opposite to the input signal light, so as to be output to any of the input/output ports 101a to 101e of the input/output unit 101, other than the input/output port that has been used for inputting the signal light. In FIGS. 1 and 2, signal light beams traveling from the input/output ports 101a to 101e to the deflection elements 106a to 106e are rendered by the solid lines, and signal light beams travelling from the deflection elements 106a to 106e to the input/output ports 101a to 101e are rendered by the broken lines.

Figure 3:
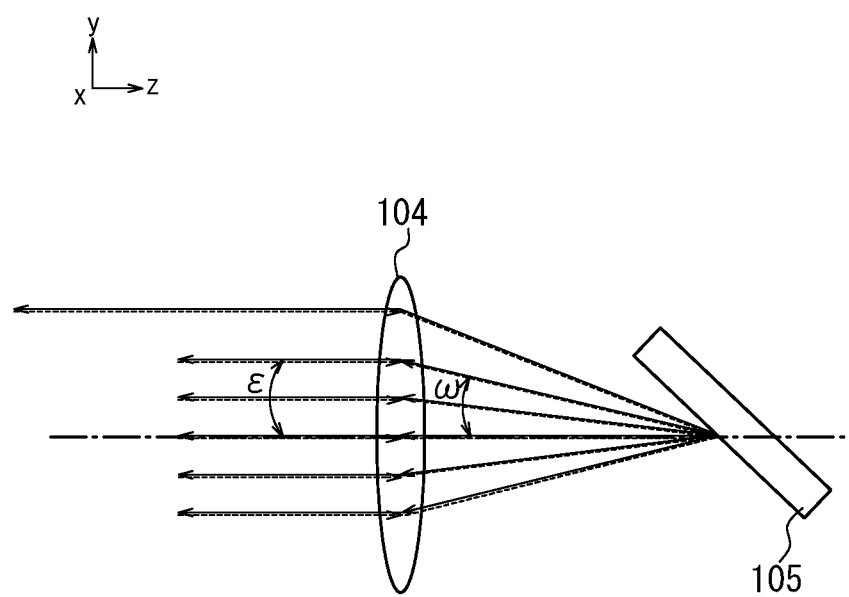
FIG. 3 is a view for illustrating an angle between a light beam dispersed by the dispersive portion to be incident on the second condensing optical system and an optical axis, and an angle between a light beam emitted from the second condenser lens and the optical axis.

As illustrated in FIG. 3, an angle ω is formed in the y direction between a light beam that has been dispersed by the dispersive portion 105 to be incident on the second condenser lens 104 and the optical axis of the second condenser lens 104 in the yz plane, while an angle ϵ is formed in the y direction between a light beam output from the second condenser lens 104 after passing through the second condenser lens 104 and the optical axis of the second condenser lens 104.

Figure 4:
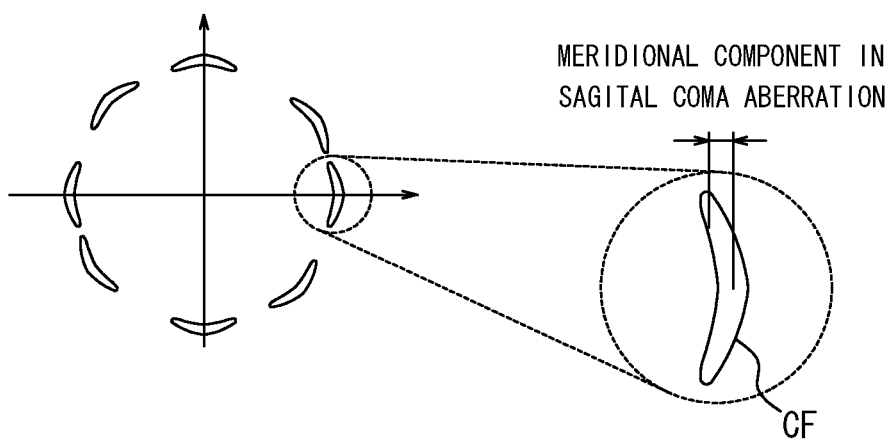
FIG. 4 is a spot diagram for illustrating the meridional component in a sagittal coma aberration.

The second condenser lens 104 has at least one surface formed aspherical so that the aberration amount of the meridional component in a sagittal coma aberration remains substantially constant irrespective of the angle ω (see FIG. 3) formed by a light beam incident on the second condenser lens 104 at an incident position at a certain height in the x direction. Here, the meridional component in a sagittal coma aberration refers to a radiation direction component in a sagittal coma flare CF generated in an image field at a position distant from the optical axis, as illustrated in FIG. 4.

It should be noted that the aberration amount of the meridional component in the sagittal coma aberration can be made substantially constant irrespective of the angle ω when the aspherical transmission surface formed on the second condenser lens 104 is in an aspherical shape that gives a maximum value of less than 0.2 in the following Expression (1):

$$\left| \left( \frac{Z_{asp}(h)}{Z_{sp}(h)} - 1 \right) \times \frac{f}{H\omega} \right|. \tag{1}$$

In Expression (1), f represents a focal length of the second condenser lens 104, H represents a height in the x direction of light passing through the second condenser lens 104, $Z_{asp}(h)$ represents an amount of sag of a plane parallel in the z direction to the aspherical surface defined by Expression (2), $Z_{sp}(h)$ represents an amount of sag of a plane parallel in the z direction to a spherical surface defined by Expression (3), and h represents a height in the y direction of light passing through the second condenser lens 104.

$$Z_{asp}(h) = \frac{c \times h^2}{1 + \sqrt{1 - (1+k) \times c^2 \times h^2}} + \sum_{i=2} A_i h^{2i} \tag{2}$$

$$Z_{sp}(h) = \frac{c \times h^2}{1 + \sqrt{1 - c^2 \times h^2}} \tag{3}$$

In Expressions (2) and (3), c represents a curvature, k represents a conic coefficient, and $A_i$ (i is an integer of 2 or more) represents an aspherical coefficient of 2i-th order.

In this embodiment, as illustrated in FIG. 3, the angle ϵ is substantially zero, and hence the aberration amount of the meridonal component in the sagittal coma aberration remains constant irrespective of the incident position of light. Therefore, the aberration amount of the meridonal component in the sagittal coma aberration in the second condenser lens 104 remains constant regardless of which of the input/output ports is used to input signal light. Further, the aberration amount of the meridonal component in the sagittal coma aberration remains substantially constant irrespective of the angle ω.

The wavelength selective switch 100 of the first embodiment configured as described above is capable of including twenty or more input/output ports while ensuring a favorable transmission band at the same time. The effect thus produced is described below in detail.

As described above, the transmission band is required to have a desired width. The transmission band varies depending a position shift S between the convergent position of signal light incident on the deflection elements 106a to 106e and the center of the deflection elements 106a to 106e along the y direction, and a width W of the deflection elements 106a to 106e in the y direction.

The transmission band increases with a decrease in the ratio (S/W) of the position shift S to the width W. Therefore, the ratio (S/W) of the position shift S to the width W is capped with an upper limit value of, for example, 0.07, in order to obtain a transmission band of desired width. In order to reduce the ratio, the position shift S needs to be reduced.

Meanwhile, when a condenser lens different from the second condenser lens 104 of the first embodiment is employed, the position shift S may be increased depending on the number of the input/output ports. Description is given of such an increase in the position shift S.

Figure 5:
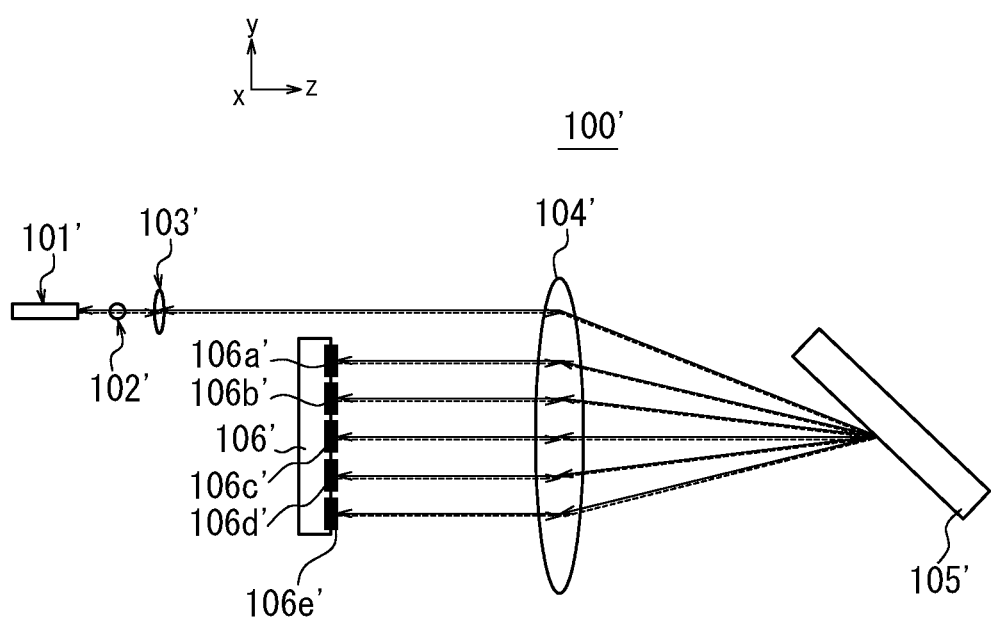
FIG. 5 is a plan view illustrating a schematic configuration of a wavelength selective switch which employs a spherical lens as the second condenser lens.
Figure 6:
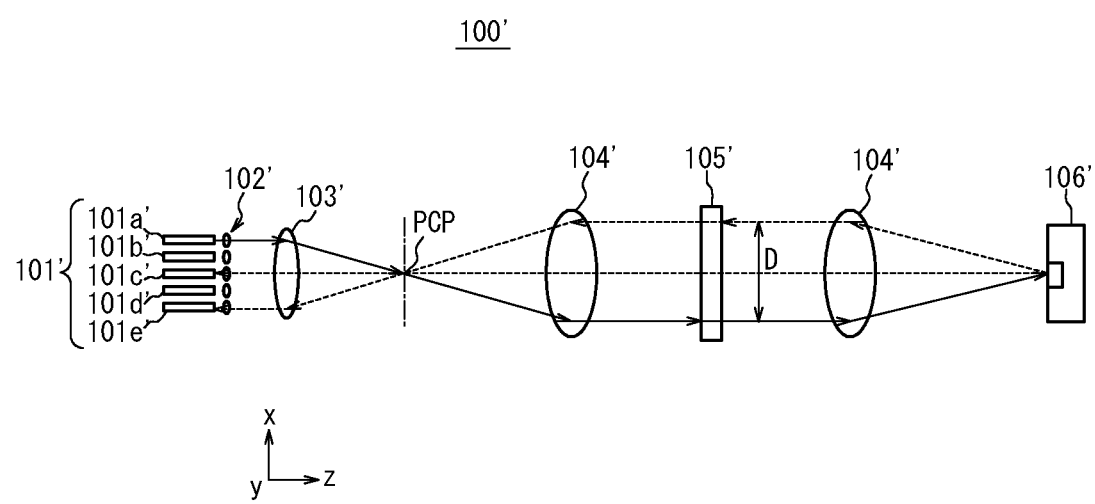
FIG. 6 is a development view of the optical paths of FIG. 5 viewed from the side.

FIGS. 5 and 6 each illustrate a wavelength selective switch 100' which employs a condenser lens different from the second condenser lens 104 of the first embodiment. The wavelength selective switch 100' is all the same in configuration as the wavelength selective switch 100 of the first embodiment, except for the second condenser lens 104'.

Unlike in the first embodiment, the second condenser lens 104' is not designed to have a substantially constant aberration amount of the meridional component in a sagittal coma aberration irrespective of the angle ω formed by a light beam incident the second condenser lens 104' at an incident position at a certain height in the x direction. For example, the second condenser lens 104' has both surfaces formed in spherical shapes. The second condenser lens 104' is designed and disposed so as to converts signal light dispersed by a dispersive portion 105' into convergent light beams parallel to one another so as to be incident on the incidence plane of a deflection portion 106' substantially at right angles thereto in the y direction.

In this case, with increasing distance of input/output ports 101a' to 101e' inputting input light, from the optical axis of the second condenser lens 104' in the x direction, the position shift S becomes larger. For this reason, when the number of input/output ports is increased, an input/output port distant from the optical axis is likely to have the ratio of the position shift S to the width W exceeding the upper limit.

In view of this, in the wavelength selective switch 100', the number of input/output ports to be provided to the wavelength selective switch 100' is limited to, for example, 10, to thereby keep the ratio (S/W) of the position shift S to the width W less than the upper limit value.

The inventors of the present invention have found out that the followings. That is, the position shift S between the convergent position of signal light incident on the deflection elements 106a to 106e and the center of the deflection elements 106a to 106e along the y direction is highly correlated with the meridional component in a sagittal coma aberration caused by the second condenser lens 104. The correlation is described below.

In the wavelength selective switch 100', the aberration amount of the meridional component in a sagittal coma aberration caused by the second condenser lens 104' increases with increasing distance from the optical axis of the second condenser lens 104' to the position where the light passes therethrough.

Accordingly, along with increasing distance from the optical axis of the second condenser lens 104' to the incident position in the y direction of light dispersed by the dispersive portion 105' to be incident on the second condenser lens 104' (see FIG. 5), the aberration amount increases. The increase in distance from the optical axis of the second condenser lens 104' to the incident position in the y direction leads to an increase of the angle ω formed in the y direction between the optical axis of the second condenser lens 104' and the dispersed light in the yz plane, which also results in an increase of the aberration amount.

Further, along with increasing distance in the x direction from the optical axis of the second condenser lens 104' to an input/output port receiving input signal light, the distance from the optical axis of the second condenser lens 104' to the incident position on the second condenser lens 104' also increases in the x direction (see FIG. 6), which results in an increase in the aberration amount.

Figure 7:
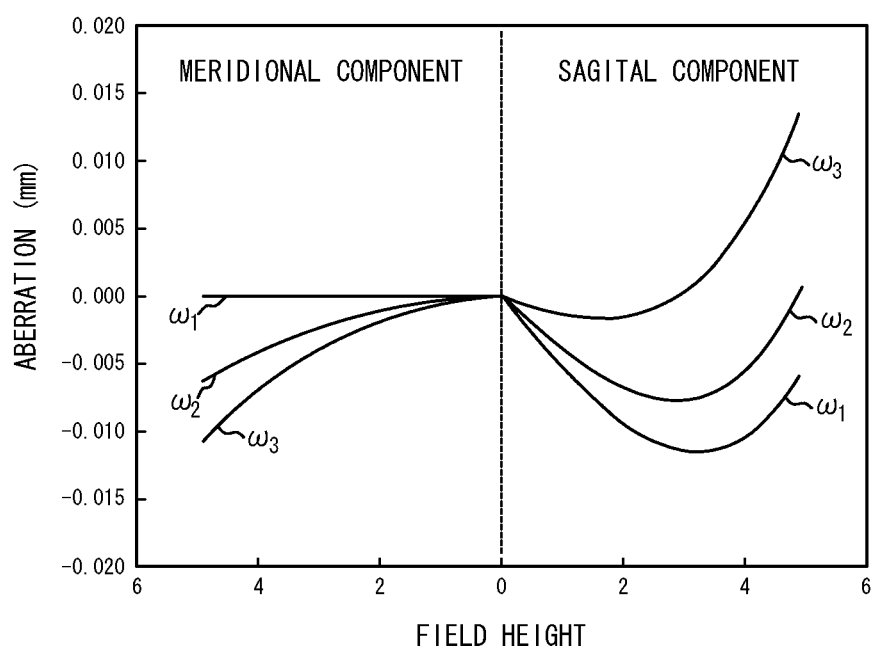
FIG. 7 is a lateral aberration diagram of a sagittal coma aberration caused by a spherical lens which is employed in place of the second condenser lens in the first embodiment.

For example, assuming that a diaphragm may be disposed on the front focal position of the second condenser lens 104' so that a distance D (see FIG. 6) is defined between signal light beams at both ends along the x direction, among the signal light beams from the input/output ports 101'a to 101'e to be passed through the second condenser lens 104', and that the angle ω formed in the y direction in the yz plane between the optical axis of the second condenser lens 104' and a dispersed light beam may be as a field angle, a sagittal coma aberration is obtained as shown in FIG. 7.

FIG. 7 shows, on the left of zero Field Height, the meridional components in sagittal coma aberrations for respective field angles, while showing, on the right of zero Field Height, the sagittal components in the sagittal coma aberrations for the respective field angle. As shown in FIG. 7, the meridional components in the sagittal coma aberrations draw curved lines that are different depending on the field angle, and the differences between the aberration amounts of the meridional components corresponding to different field angles are larger as Field Height becomes higher.

Figure 8:
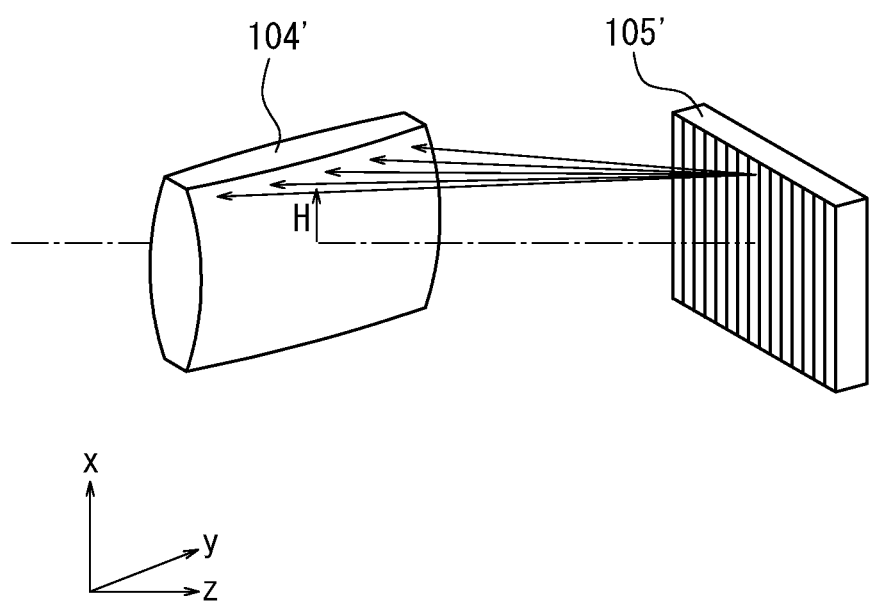
FIG. 8 is a view for illustrating the height in the x direction of light passing through the second condenser lens.

Therefore, the aberration amount of the meridional component in a sagittal coma aberration in an optical image incident onto the second condenser lens 104' from the dispersive portion 105' varies depending on the angle ω formed in the y direction in the yz plane between the optical axis of the second condenser lens 104' and a dispersed light beam, and the differences between the aberration amounts increase as a height (H, see FIG. 8) (Field Height) of the light beam passing through the second condenser lens 104' becomes higher.

When the aberration amount of the meridional component in a sagittal coma aberration caused by the second condenser lens 104' varies depending on the field angle (ω) of incident light, a position shift S is generated based on the height (H) in the x direction of the input/output ports 101a to 101e inputting signal light, from the optical axis of the second condenser lens 104. Further, as the difference in aberration amount increases, the position shift S becomes larger.

In view of the above-mentioned phenomenon found out by the inventors of the present invention, the second condenser lens 104 in this embodiment is formed so that the aberration amount of the meridional component in a sagittal coma aberration can be made substantially constant irrespective of the angle ω formed by a light beam incident on the second condenser lens 104 at an incident position at a certain height in the x direction. As a result, the distance from the optical axis of the second condenser lens 104 to the input/output ports 101a to 101e in the x direction can be increased without leading to a large increase in the position shift S.

Therefore, the position shift S increases by a smaller amount even with increasing distance from the optical axis of the second condenser lens 104 to the input/output ports 101a to 101e in the x direction, which allows the number of the input/output ports 101a to 101e to be increased until the ratio of the position shift S to the width W of the deflection elements 106a to 106e reaches an upper limit value. In other words, it is possible to provide a wavelength selective switch 100 capable of including at least twenty or more of the input/output ports 101a to 101e while attaining a desired transmission bandwidth.

Next, a wavelength selective switch according to a second embodiment is described. The second embodiment is different from the first embodiment in that the first condenser lens and the second condenser lens are configured as mirrors. In the following, the second embodiment is described mainly about the differences from the first embodiment. The components similar in function and configuration to those of the first embodiment are denoted by the same reference symbols, and the description thereof is omitted.

Figure 9:
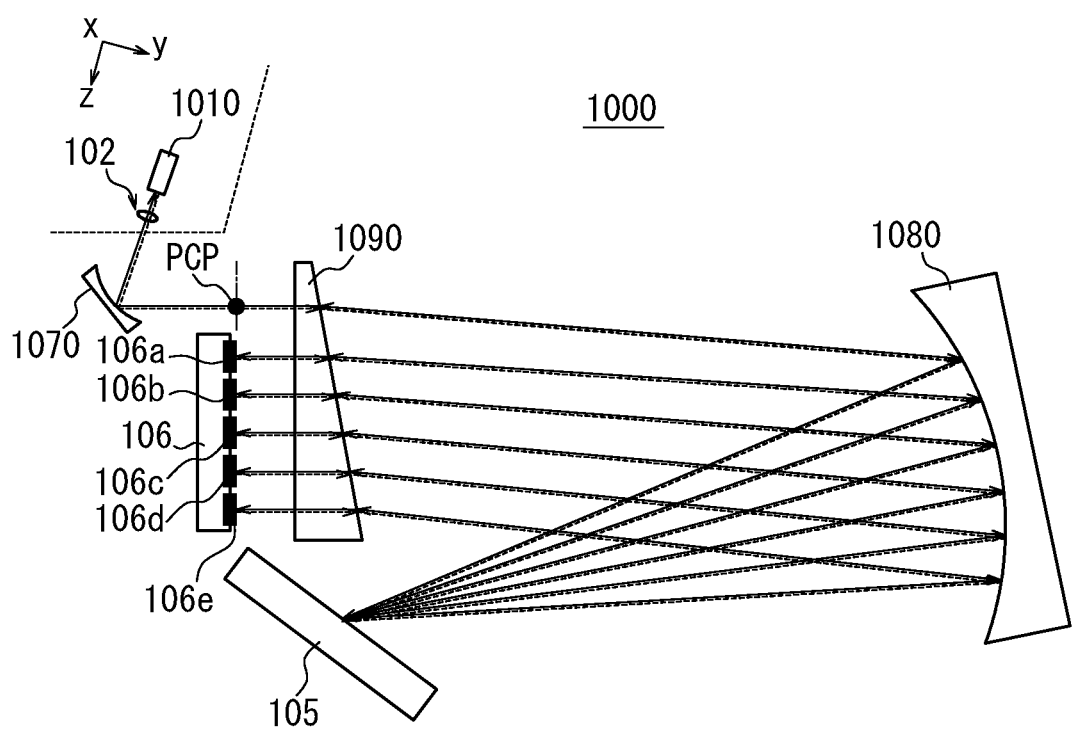
FIG. 9 is a plan view illustrating a schematic configuration of a wavelength selective switch according to a second embodiment of the present invention.
Figure 10:
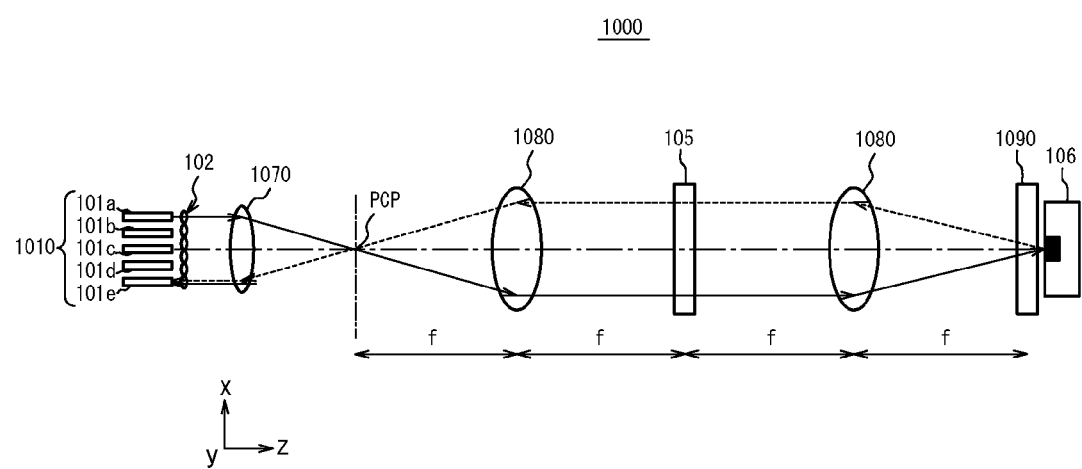
FIG. 10 is a development view of the optical paths of FIG. 9 viewed from the side.

As illustrated in FIGS. 9 and 10, a wavelength selective switch 1000 is configured by including an input/output unit 1010, the micro lens array 102, a first concave mirror 1070, a second concave mirror 1080 (condensing optical system), the dispersive portion 105, a deflection prism 1090, and the deflection portion 106.

As in the first embodiment, the input/output unit 1010 includes at least twenty input/output ports. However, for the sake of convenience in description, FIG. 10 illustrates only five input/output ports 101a to 101e. The micro lens array 102 is similarly disposed as in the first embodiment relative to the input/output unit 1010.

The first concave mirror 1070 reflects incident light beams parallel to the z direction and condenses the light beams onto the primary condensing point PCP (see FIG. 10). Therefore, light that has been incident on any of the input/output ports 101a to 101e is condensed onto the primary condensing point PCP by the first concave mirror 1070. Further, the first concave mirror 1070 is designed as described later so as to cause a sagittal coma aberration.

The second concave mirror 1080 is disposed in a position where a distance from the primary condensing point PCP to the second concave mirror 1080 becomes equal to the focal length f of the second concave mirror 1080 (see FIG. 10). Further, the second concave mirror 1080 is disposed so that a plane including the optical axis of the first concave mirror 1070 and the second concave mirror 1080 becomes parallel to the yz plane. With this configuration, the second concave mirror 1080 deflects light that has passed through the primary condensing point PCP, in a direction parallel to the yz plane (see FIG. 10).

The second concave mirror 1080 is formed in an aspherical shape so that the aberration amount of the meridional component in a sagittal coma aberration caused by light incident on the second concave mirror 1080 at an incident position at a certain height in the x direction may be made substantially constant irrespective of the angle ω. Here, the angle ω is an angle formed in the y direction in the yz plane between the signal light that has been dispersed by the dispersive portion 105 to be incident on the second concave mirror 1080 and the optical axis of the second concave mirror 1080. Meanwhile, the first concave mirror 1070 is designed so as to cause a sagittal coma aberration in the first concave mirror 1070 for canceling out a sagittal coma aberration to be caused by a signal light beam at an arbitrary field angle in the second concave mirror 1080.

It should be noted that the aberration amount of the meridonal component in the sagittal coma aberration can be made substantially constant irrespective of the angle ω when the second concave mirror 1080 has a reflective surface formed in an aspherical shape which gives a maximum value of less than 0.02 in Expression (1).

The dispersive portion 105 is disposed in a position where a distance from the second concave mirror 1080 to the dispersive portion 105 becomes equal to the focal length f of the second concave mirror 1080. Therefore, as illustrated in FIG. 9, signal light reflected by the second concave mirror 1080 after passing through the primary condensing point PCP toward the deflection prism 1090 and toward the second concave mirror 1080 is converted into substantially parallel light beams to be incident on the dispersive portion 105. As in the first embodiment, the dispersive portion 105 separates the signal light into light beams of different wavelengths which are included in the signal light.

The deflection portion 106 is disposed in a position where a distance from the second concave mirror 1080 to the incidence plane of the deflection portion 106 becomes equal to the focal length f of the second concave mirror 1080. As in the first embodiment, the deflection portion 106 includes, on the incidence plane thereof, a plurality of deflection elements 106a to 106e arranged along the y direction. With this configuration, signal light dispersed by the dispersive portion 105 is converted by the second concave mirror 1080 into convergent light beams parallel to one another, so as to be incident on the incidence plane of the deflection portion 106.

The deflection prism 1090 is disposed between the second concave mirror 1080 and the primary condensing point PCP and between the second concave mirror 1080 and the deflection portion 106. The deflection prism 1090 deflects signal light beams traveling from the second concave mirror 1080 toward the deflection portion 106 so that the principal rays of the signal light beams become perpendicular to the y direction of the incidence plane of the deflection portion 106 in the yz plane.

As in the first embodiment, signal light has passed through the primary condensing point PCP is dispersed by the dispersive portion 105, and then condensed at a height position (position in the x direction) where the optical axis of the second concave mirror 1080 meets deflection elements in the yz plane. Therefore, as in the first embodiment, the signal light beams from the input/output ports 101a to 101e are all be condensed onto the deflection elements 106a to 106e.

The deflection portion 106 is configured similarly to the first embodiment. Therefore, the deflection elements 106a to 106e reflect the incident light beams in wavelengths, in a height direction different from the incident direction. The signal light beams in wavelengths reflected by the respective deflection elements 106a to 106e each pass through the second concave mirror 1080 to be diffracted by the dispersive portion 105, and travel along an optical path in a direction opposite to the input signal light, so as to be output to any of the input/output ports 101a to 101e of the input/output unit 1010, other than the input/output port that has been used for inputting the signal light.

The wavelength selective switch 1000 of the second embodiment configured as described above is capable of including twenty or more input/output ports while ensuring a favorable transmission band at the same time.

The second concave mirror 1080 has a light-condensing function, similarly to the second condenser lens 104 of the first embodiment. Accordingly, the second concave mirror 1080 is formed so that the aberration amount of the meridional component in a sagittal coma aberration can be made substantially constant irrespective of the angle ω formed by a light beam incident on the second concave mirror 1080 at an incident position at a certain height in the x direction. As a result, the distance from the optical axis of the second concave mirror 1080 to the input/output ports 101a to 101e in the x direction can be increased without leading to a large increase in the position shift S.

Therefore, as in the first embodiment, the position shift S increases by a smaller amount even with increasing distance from the optical axis of the second concave mirror 1080 to the input/output ports 101a to 101e in the x direction, which allows the number of the input/output ports 101a to 101e to be increased until the ratio of the position shift S to the width W of the deflection elements 106a to 106e reaches an upper limit value.

Further, the wavelength selective switch 1000 of the second embodiment employs the second concave mirror 1080 in place of the second condenser lens 104, which allows the dispersive portion 105 to be disposed on the deflection portion 106 side relative to the second concave mirror 1080. Such an arrangement is capable of attaining a reduction in size of the wavelength selective switch 1000 in the yz plane.

Next, a wavelength selective switch according to a third embodiment is described. The third embodiment is different from the second embodiment in that a Mangin mirror is employed in place of the second concave mirror 1080. In the following, the third embodiment is described mainly about the differences from the second embodiment. The components similar in function and configuration to those of the second embodiment are denoted by the same reference symbols, and the description thereof is omitted.

Figure 11:
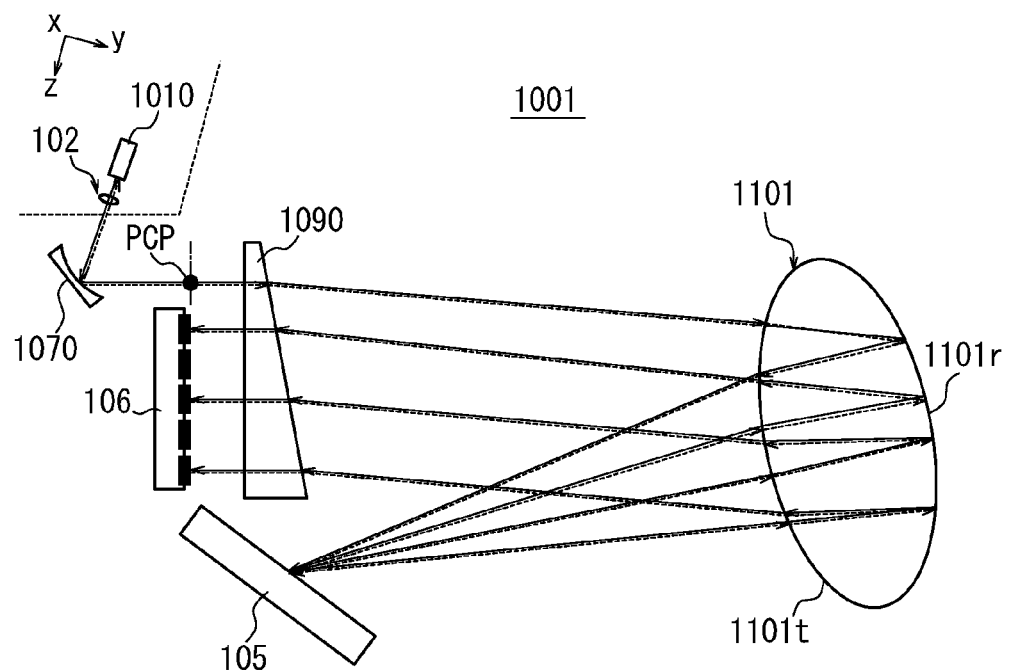
FIG. 11 is a plan view illustrating a schematic configuration of a wavelength selective switch according to a third embodiment of the present invention.

As illustrated in FIG. 11, a wavelength selective switch 1001 according to the third embodiment is similar to the wavelength selective switch 1000 of the second embodiment in configuration, function, and arrangement, other than a Mangin mirror 1101. As in the second embodiment, the Mangin mirror 1101 is disposed in a position where the distances from the Mangin mirror 1101 to each of the primary condensing point PCP, the dispersive portion 105, and the deflection portion 106 each become equal to the focal length of the Mangin mirror 1101. The Mangin mirror 1101 may have a surface formed in a spherical shape.

Signal light that has passed through the primary condensing point PCP is transmitted through a transmission surface 1101$t$ of the Mangin mirror 1101 to pass through inside a medium thereof, so as to be incident on a reflective surface 1101$r$. The signal light is reflected by the reflective surface 1101$r$ toward the dispersive portion 105.

The wavelength selective switch 1001 according to the third embodiment configured as described above is capable of including twenty or more input/output ports while ensuring a favorable transmission band at the same time.

Figure 12:
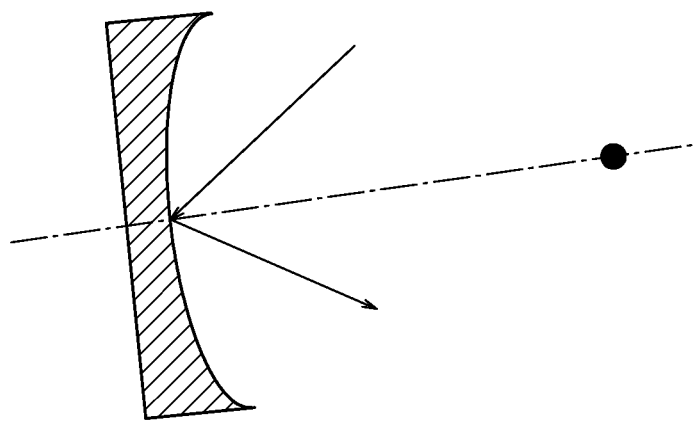
FIG. 12 is a first diagram for illustrating an optical axis of a concave mirror.
Figure 13:
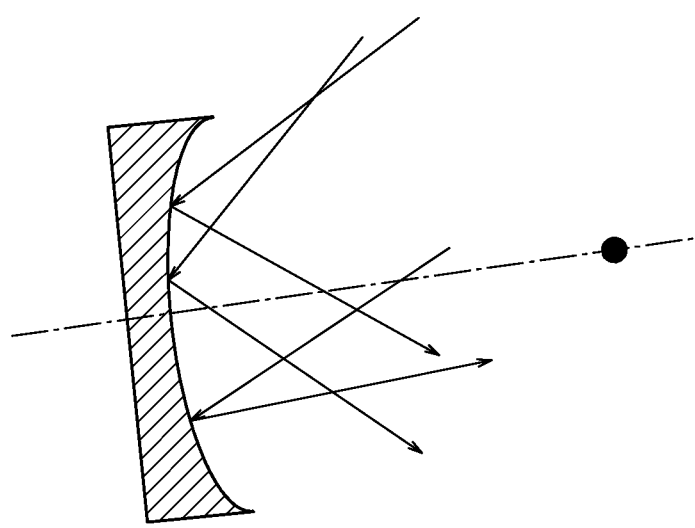
FIG. 13 is a second view for illustrating the optical axis of the concave mirror.

To describe effects of employing the Mangin mirror 1101, a study is made on a case of employing a concave mirror having a reflective surface in a spherical shape. In the case of employing a concave mirror having a reflective surface in a spherical shape, the optical axis cannot be defined because the concave mirror is in a spherical shape. Therefore, as illustrated in FIG. 12, when only one light beam is incident on the concave mirror, the optical axis is defined by a line connecting the spherical center position of the spherical shape of the concave mirror and the incident position of the light beam. Further, as illustrated in FIG. 13, when a plurality of light beams are incident on the concave mirror, the optical axis is defined by a line connecting the spherical center position and the vicinity of the center of the incident positions of the plurality of light beams.

When a concave mirror in a spherical shape having a focal length equal to that of the Mangin mirror 1101 is employed in place of the Mangin mirror 1101, a relatively large sagittal coma aberration is caused in an optical image formed by the signal light.

Therefore, a relatively large difference is generated in aberration amount of the meridional component in a sagittal coma aberration caused by the concave mirror in a spherical shape thus employed, in an optical image formed by a plurality of signal light beams that are different in field angle. On the other hand, the Mangin mirror 1101 is configured so as to allow signal light to be transmitted though inside a medium of the Mangin mirror 1101 to be reflected by the reflective surface 1101$r$. Therefore, as described later, the Mangin mirror 1101 can be increased in curvature radius as compared to a concave mirror in a spherical shape.

When a concave mirror in a spherical shape has a curvature radius R, the concave mirror in a spherical shape has a focal length R/2. On the other hand, the focal length of the Mangin mirror 1101 is defined as R'/(2×n), when the medium has a refractive index n, the transmission surface 1101$t$ has an infinite curvature radius, and the reflective surface 1101$r$ has a curvature radius R'. When the concave mirror and the Mangin mirror are the same in focal length, the Mangin mirror 1101 has a curvature radius R' which is n×R. Therefore, the curvature radius of the Mangin mirror 1101 becomes equal to a value obtained by multiplying the curvature radius of the concave mirror in a spherical shape by the refractive index thereof.

As described above, the Mangin mirror 1101 can be increased in curvature radius of the reflective surface 1101$r$, and hence, as compared to a concave mirror in a spherical shape, the reflective surface 1101$r$ can be made small in volume of a spherical segment, so that the Mangin mirror 1101 can be formed in a shape close to a flat shape. With the Mangin mirror 1101 being in a shape closer to a flat shape, the sagittal coma aberration can itself be reduced with respect to the full angular field of view, as compared to the case of employing a concave mirror in a spherical shape. Therefore, the third embodiment is also capable of making substantially constant the aberration amount of the meridional component in a sagittal coma aberration irrespective of the angle $\omega$ formed by a light beam incident on the Mangin mirror 1101 at an incident position at a certain height in the x direction.

For the reasons as described above, the distance from the optical axis of the Mangin mirror 1101 to the input/output ports 101$a$ to 101$e$ in the x direction can be increased without leading to a large increase in the position shift S. Therefore, as in the first embodiment, the position shift S increases by a smaller amount even with increasing distance from the optical axis of the Mangin mirror 1101 to the input/output ports 101$a$ to 101$e$ in the x direction, which allows the number of the input/output ports 101$a$ to 101$e$ to be increased until the ratio of the position shift S to the width W of the deflection elements 106$a$ to 106$e$ reaches an upper limit value.

The transmission surface of the Mangin mirror 1101 may be the formed in the same shape as the aspherical shape of the condenser lens 104. Specifically, the transmission surface of the Mangin mirror 1101 may be formed in an aspherical shape that gives a maximum value of less than 0.2 in Expression (1). Alternatively or additionally, the reflective surface of the Mangin mirror 1101 may be formed in the same shape as the aspherical shape of the second concave mirror 1080 of the second embodiment. Specifically, the reflective surface of the Mangin mirror 1101 may be formed in an aspherical shape that gives a maximum value of less than 0.02 in Expression (1).

The Mangin mirror 1101 having the transmission surface and/or the reflective surface formed in the above-mentioned aspherical shapes are capable of making constant, in a further improved manner, the aberration amount of the meridional component in a sagittal coma aberration.

Next, a wavelength selective switch according to a fourth embodiment is described. The fourth embodiment is different from the third embodiment in configuration of the Mangin mirror. In the following, the fourth embodiment is described mainly about the differences from the third embodiment. The components similar in function and configuration to those of the third embodiment are denoted by the same reference symbols, and the description thereof is omitted.

In the fourth embodiment, the Mangin mirror 1101 is formed of silicon. The refractive index of silicon is 3.4, which is larger than the refractive index of a member such as glass which is generally used for forming the Mangin mirror 1101. Therefore, the Mangin mirror 1101 can be made small in volume of a spherical segment, so that the Mangin mirror 1101 can be formed in a shape close to a flat shape. Therefore, the coma aberration can itself be further reduced with respect to the full angular field of view.

Next, a wavelength selective switch according to a fifth embodiment is described. The fifth embodiment is different from the second embodiment in configuration of the second concave mirror. In the following, the fifth embodiment is described mainly about the differences from the second embodiment. The components similar in function and configuration to those of the second embodiment are denoted by the same reference symbols, and the description thereof is omitted.

Figure 14:
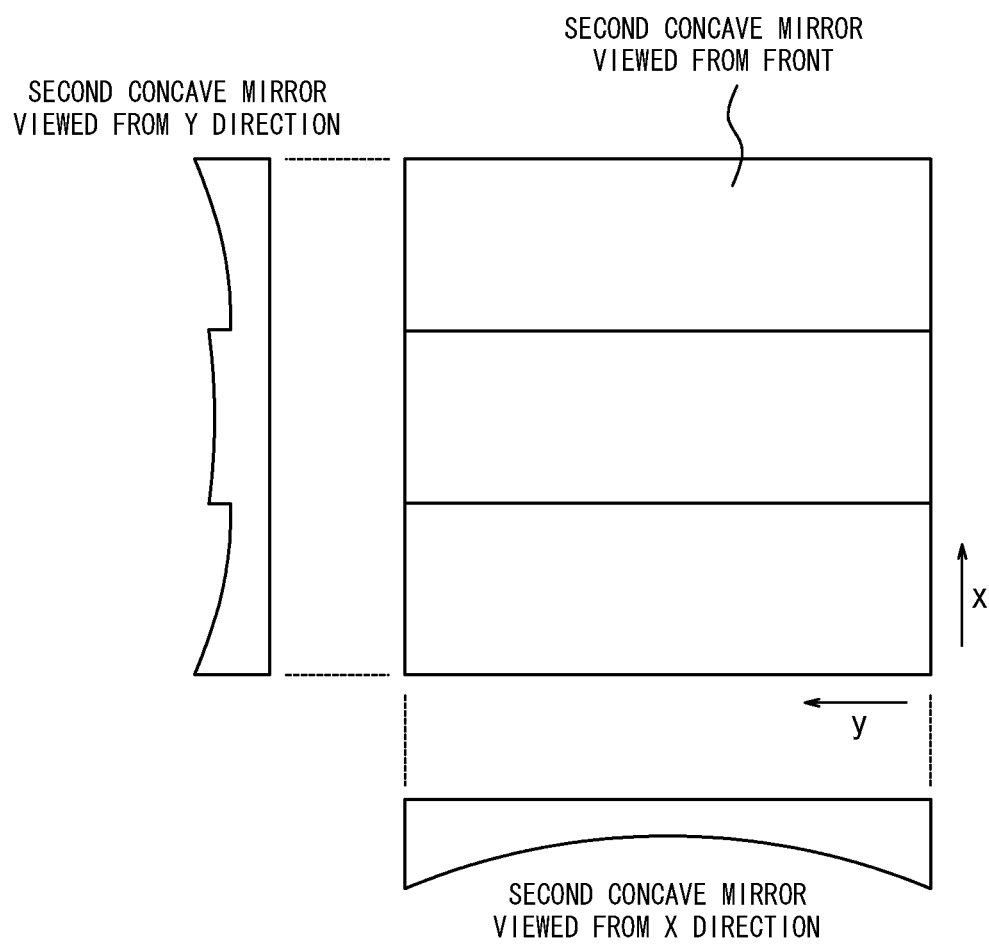
FIG. 14 is an external view of a second concave mirror employed in a fifth embodiment.

In the fifth embodiment, components other than a second concave mirror 1082 are the same in configuration, function, and arrangement as those of the second embodiment. As illustrated in FIG. 14, the second concave mirror 1082 has a spherical surface which is formed to be discontinuous only in the x direction.

The wavelength selective switch according to the fifth embodiment configured as described above is capable of including twenty or more input/output ports while ensuring a favorable transmission band at the same time.

Figure 15:
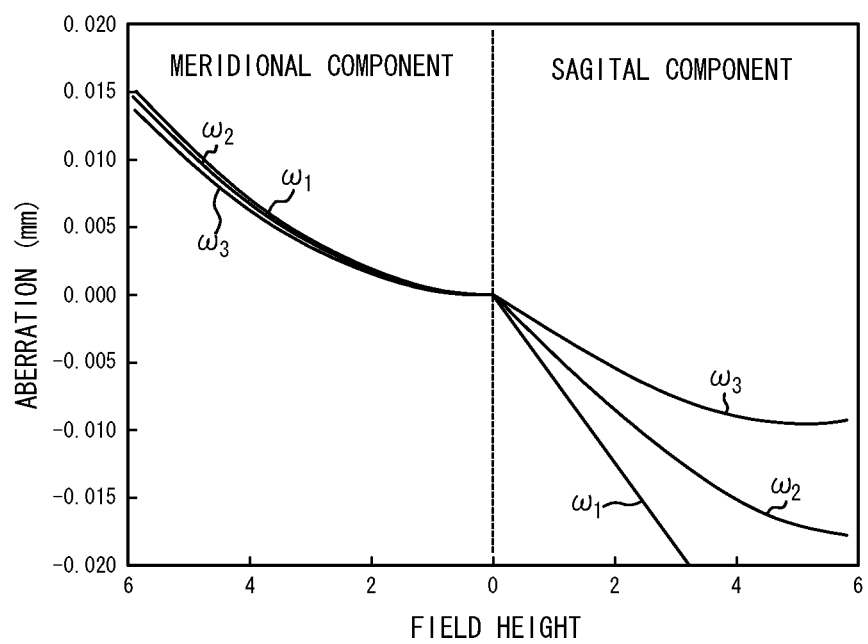
FIG. 15 is a lateral aberration diagram of a sagittal coma aberration caused by a concave mirror in a spherical shape which is employed in place of the second concave mirror in the fifth embodiment.
Figure 16:
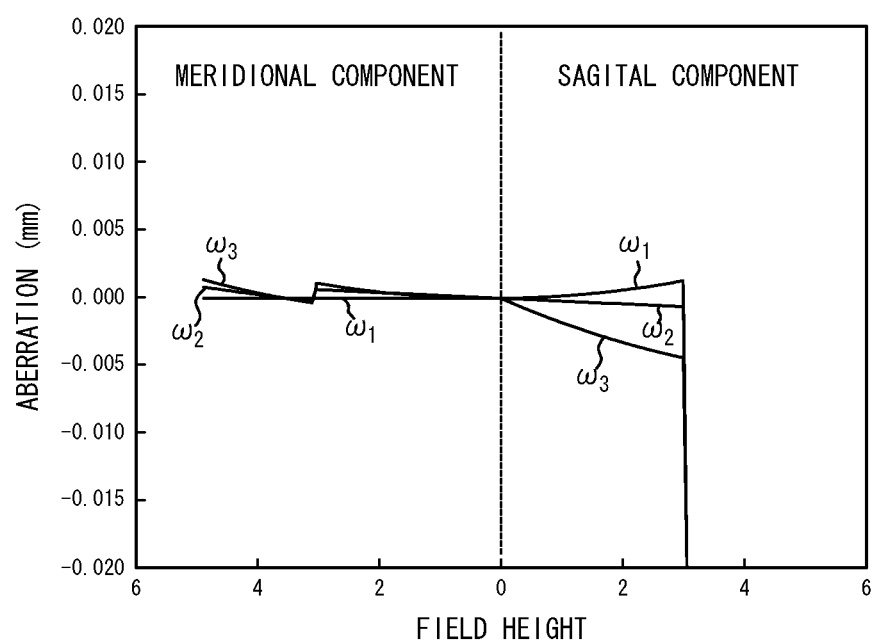
FIG. 16 is a lateral aberration diagram of a sagittal coma aberration caused by the second concave mirror in the fifth embodiment.

When a concave mirror in a spherical shape is employed, the meridional component in a sagittal coma aberration increases with respect to any field angle, as Field Height becomes higher with the increasing distance from the optical axis, as shown in FIG. 15. On the other hand, when a spherical surface that is discontinuous only in the x direction of the second concave mirror 1082 is formed, the aberration amount of the meridional component in a sagittal coma aberration becomes zero at the discontinuous position, as shown in FIG. 16. Therefore, the differences between the aberration amounts of the meridional component in a sagittal coma aberration with respect to signal light beams at different field angles are smaller, as compared to those of a concave mirror in a spherical shape, even at a position where Field Height is higher with increasing distance from the optical axis.

Therefore, the aberration amount of the meridional component in a sagittal coma aberration can be considered as being substantially constant irrespective of the angle $\omega$ formed by a light beam incident on the second concave mirror 1082 at an incident position at a certain height in the x direction. As a result, the distance from the optical axis of the second concave mirror 1082 to the input/output ports 101a to 101e in the x direction can be increased, without leading to a large increase in the position shift S.

Therefore, as in the first embodiment, the position shift S increases by a smaller amount even with increasing distance from the optical axis of the second concave mirror 1082 to the input/output ports 101a to 101e in the x direction, which allows the number of the input/output ports 101a to 101e to be increased until the ratio of the position shift S to the width W of the deflection elements 106a to 106e reaches an upper limit value.

Next, a wavelength selective switch according to a sixth embodiment is described. The sixth embodiment is different from the second embodiment in that the second concave mirror is formed based on the interval of the deflection elements. In the following, the sixth embodiment is described mainly about the differences from the second embodiment. The components similar in function and configuration to those of the second embodiment are denoted by the same reference symbols, and the description thereof is omitted.

In the sixth embodiment, the wavelength selective switch is formed so as to satisfy Expression (4).

$$\left| \frac{(\sin\alpha_{2\ldots m} - \sin\beta_{2\ldots m}) - (\sin\alpha_1 - \sin\beta_1)}{\sin(\omega_{2\ldots m} - \omega_1)} \right| \times \frac{50}{W} < 0.003 \quad (4)$$

In Expression (4), $\omega_1$ represents a minimum field angle, $\omega_{2\ldots m}$ represents an arbitrary field angle within a range between a maximum field angle $\omega$ and $\omega_1$, $\alpha_1$ represents an angle of a light beam relative to the normal in the y direction of the image field formed by the light beam passing through the center of a diaphragm at the position of the diaphragm when the field angle is $\omega_1$, assuming that the diaphragm is disposed on the front focal position of the second concave mirror 1080, the diaphragm having a diameter which is equal to the distance D from end to end of the input/output ports 101a to 101e arranged along the x direction, $\beta_1$ represents an angle of a light beam relative to the normal in the y direction of the image field formed by the light beam passing an arbitrary height H falling within the distance (size) D of the diaphragm at the position of the diaphragm when the angle field is $\omega_1$, assuming that the above-mentioned diaphragm is disposed, $\alpha_{2\ldots m}$ represents an angle of a light beam relative to the normal in the y direction of the image field formed by the light beam passing through the center of a diaphragm at the position of the diaphragm when the field angle is $\omega_{2\ldots m}$, assuming that the above-mentioned diaphragm is disposed, $\beta_{2\ldots m}$ represents an angle of a light beam relative to the normal in the y direction of the image field formed by the light beam passing an arbitrary height H at the position of the diaphragm when the angle field is $\omega_{2\ldots m}$, assuming that the above-mentioned diaphragm is disposed, and W(GHz) represents the interval between the deflection elements.

According to the wavelength selective switch of the sixth embodiment configured as described above, the left side of Expression (4) may be given as less than 0.003, so that the ratio of the position shift S to the width W of the deflection elements 106a to 106e can be suppressed below the upper limit value, as described below.

The left side of Expression (1) bears a proportional relation to the ratio (S/W) of the position shift S to the width W of the deflection elements 106a to 106e. For example, when a concave mirror having a plurality of spherical shapes designed to give different values in the left side of Expression (4) is employed in place of the second concave mirror 1080 in the second embodiment, and the left side of Expression (4) and the ratio (S/W) are plotted on a graph, the graph of FIG. 17 is obtained.

Figure 17:
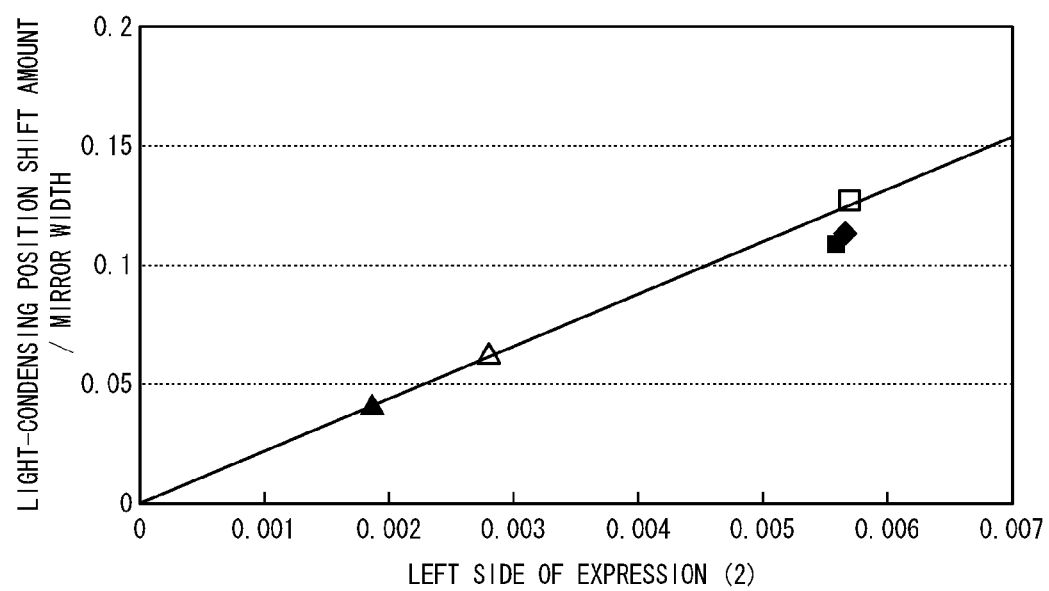
FIG. 17 is a graph showing a relation between the left side of Expression (1) and the ratio (S/W) with respect to various concave mirrors different in spherical shapes, which are each employed in place of the second concave mirror in the second embodiment.

FIG. 17 shows that the ratio (S/W) can be suppressed below 0.07 when the left side of Expression (4) is less than 0.003. However, it has been difficult to increase the number of the input/output ports 101a to 101e to be eleven or more when employing a spherical lens designed to give a value of less than 0.003 in the left side of Expression (4).

Figure 18:
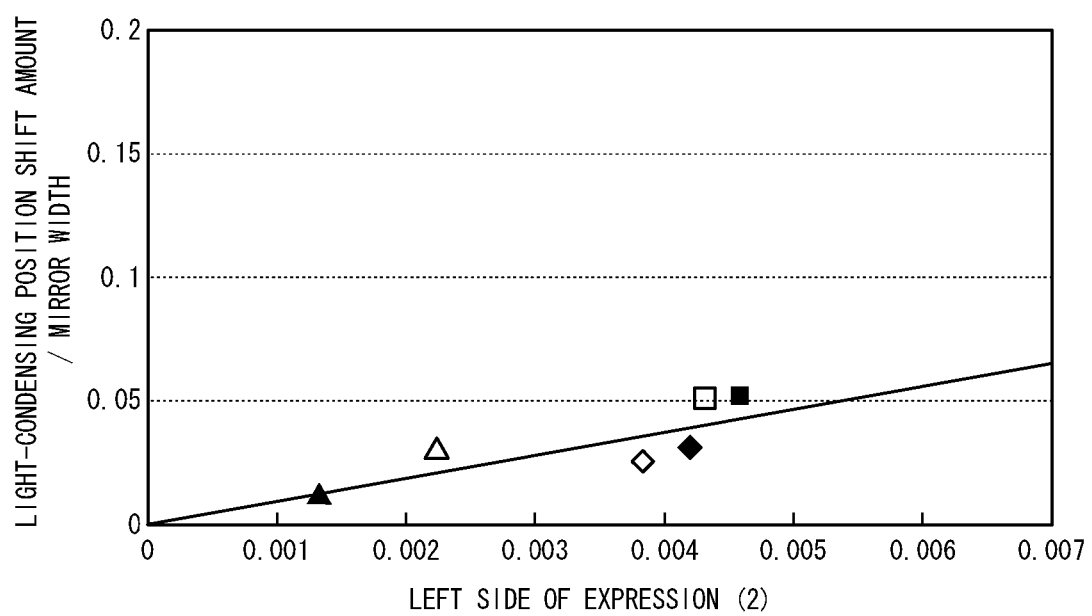
FIG. 18 is a graph showing a relation between the left side of Expression (1) and the ratio (S/W) with respect to various mirrors different in lens properties, which are each employed as the second concave mirror in the second embodiment.

On the other hand, when the second concave mirror 1080 designed to give different values in the left side of Expression (4) is employed in the second embodiment, and the left side of Expression (4) and the ratio (S/W) are plotted on a graph, the graph of FIG. 18 is obtained. Further, in the third embodiment, when the Mangin mirror 1101 designed to give different values in the left side of Expression (4) is employed, and the left side of Expression (4) and the ratio (S/W) are plotted on a graph, the graph of FIG. 19 is obtained.

Figure 19:
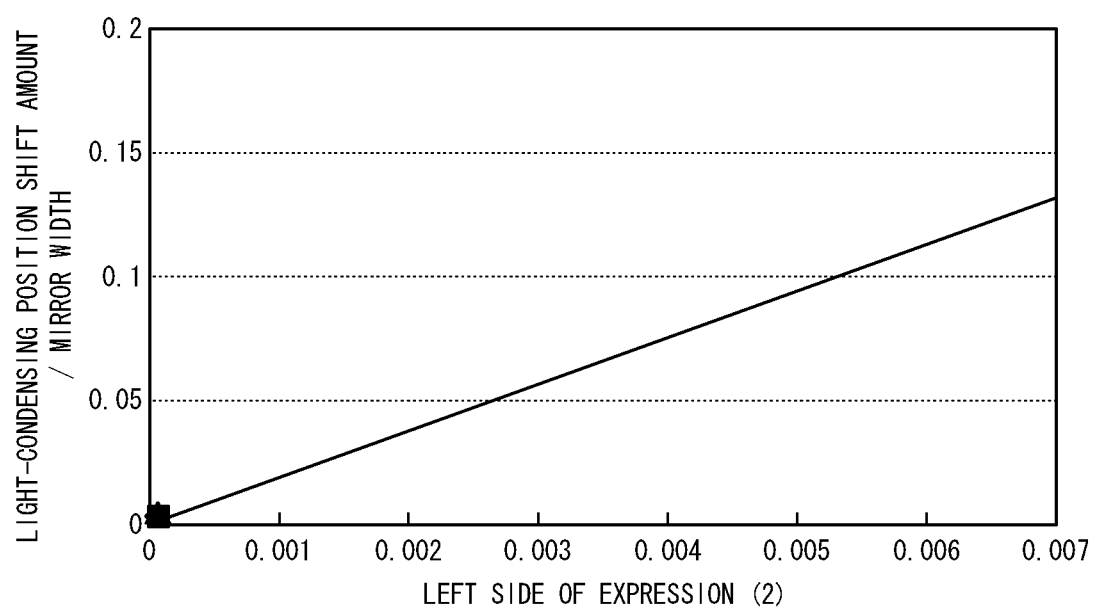
FIG. 19 is a graph showing a relation between the left side of Expression (1) and the ratio (S/W) with respect to various Mangin mirrors different in lens properties, which are each employed in the third embodiment.
Figure 20:
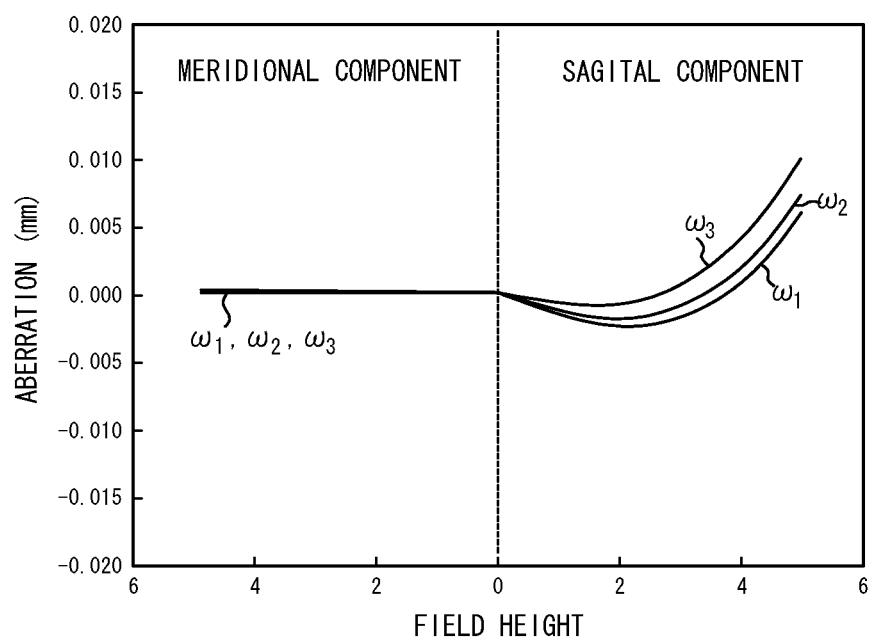
FIG. 20 is a lateral aberration diagram of a sagittal coma aberration in Example 1.
Figure 21:
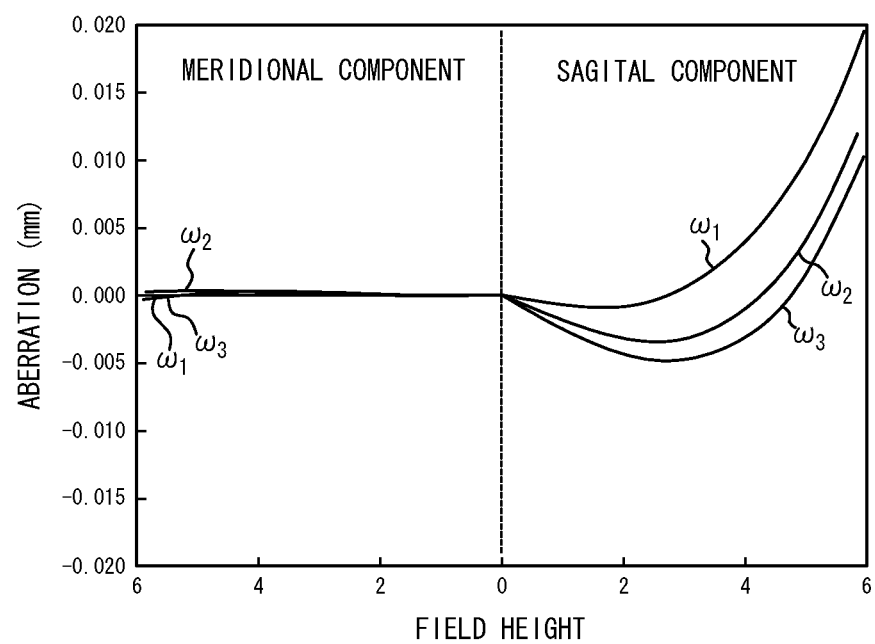
FIG. 21 is a lateral aberration diagram of a sagittal coma aberration in Example 2.
Figure 22:
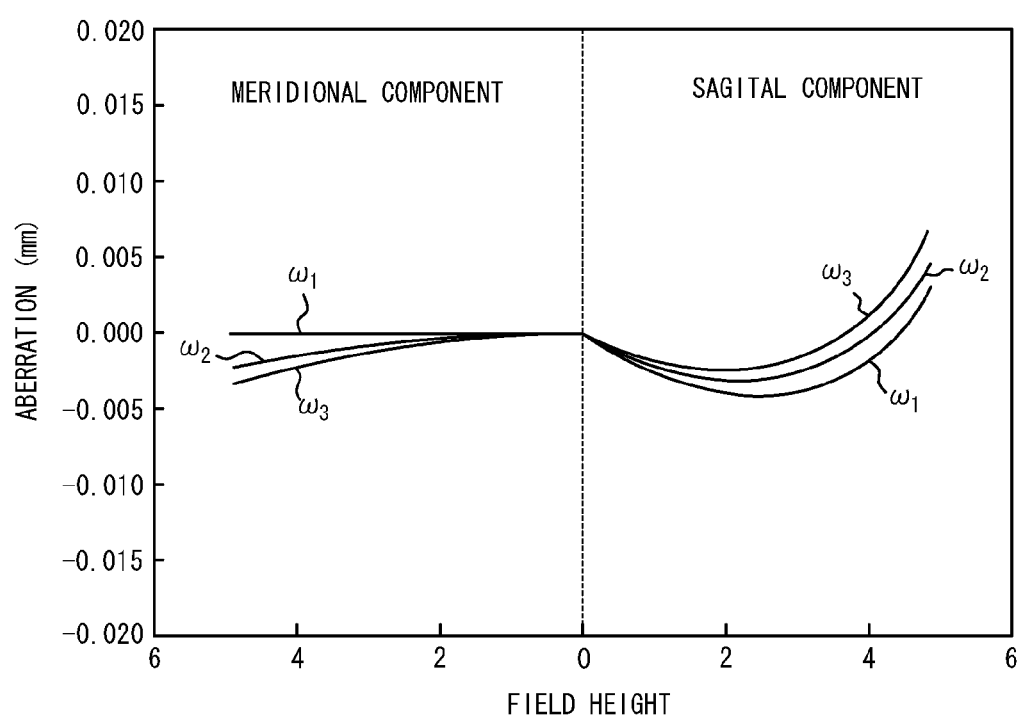
FIG. 22 is a lateral aberration diagram of a sagittal coma aberration in Example 3.
Figure 23:
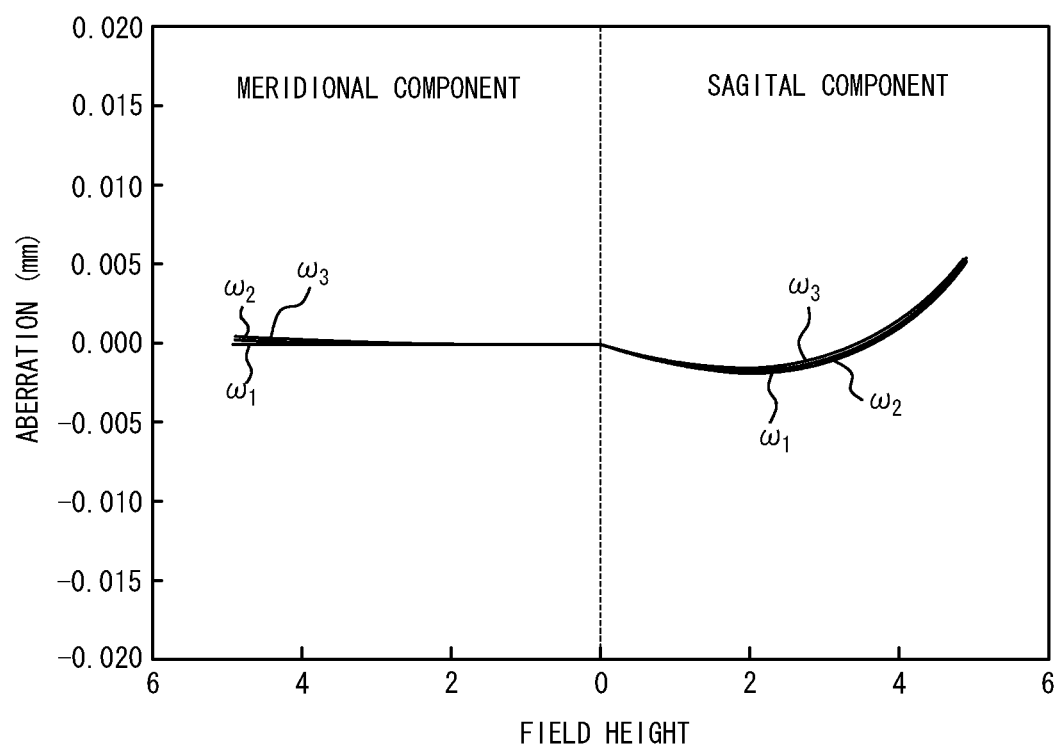
FIG. 23 is a lateral aberration diagram of a sagittal coma aberration in Example 4.
Figure 24:
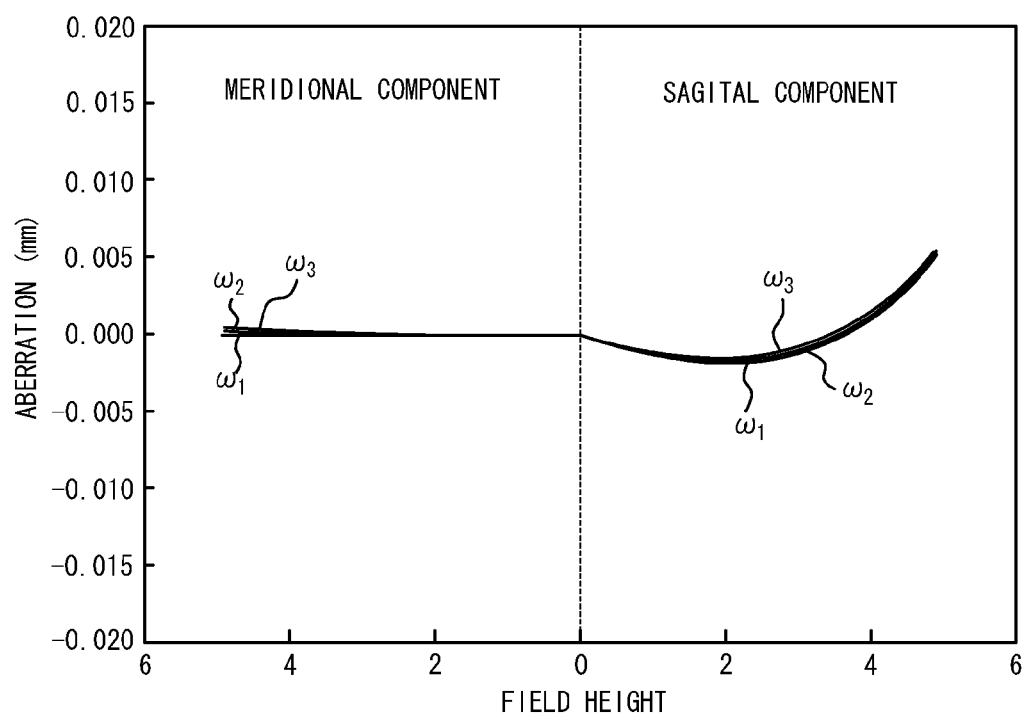
FIG. 24 is a lateral aberration diagram of a sagittal coma aberration in Example 5.
Figure 25:
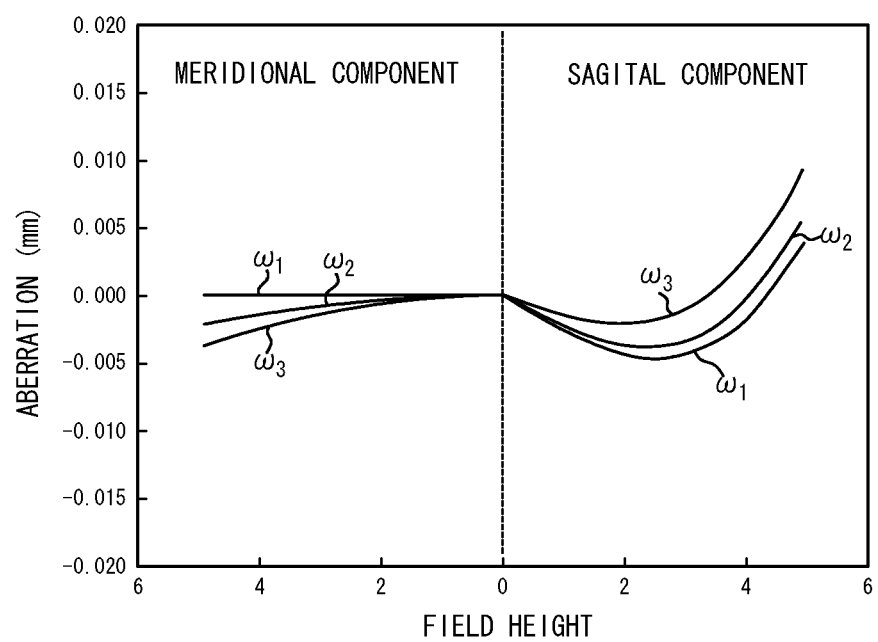
FIG. 25 is a lateral aberration diagram of a sagittal coma aberration in Example 6.
Figure 26:
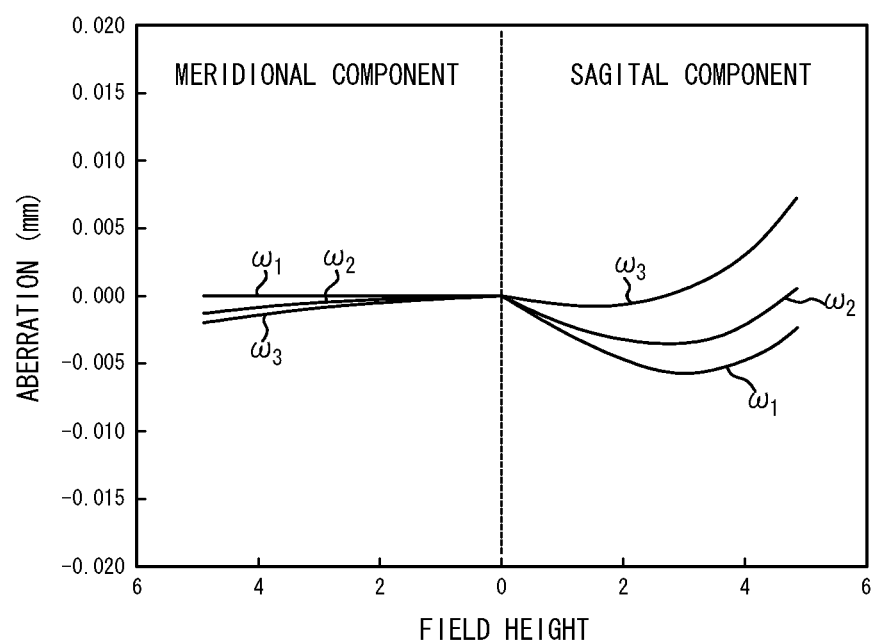
FIG. 26 is a lateral aberration diagram of a sagittal coma aberration in Example 7.

FIGS. 18 and 19 show that the left side of Expression (4) is significantly small as compared to 0.003 with the use of a concave mirror being in an aspherical shape or a Mangin mirror. Therefore, the number of the input/output ports 101*a* to 101*e* can be increased to eleven or more with the use of a concave mirror being in an aspherical shape and a Mangin mirror that is designed to give a value of less than 0.003 in the left side of Expression (4).

Next, the wavelength selective switch according to a seventh embodiment is described. The seventh embodiment is different from the second embodiment in that the second concave mirror is formed based on the interval between the deflection elements and the number of the input/output ports. In the following, the seventh embodiment is described mainly about the differences from the second embodiment. The components similar in function and configuration to those of the second embodiment are denoted by the same reference symbols, and the description thereof is omitted.

In the seventh embodiment, the wavelength selective switch is formed so as to satisfy Expression (5).

$$\left|\frac{(\sin\alpha_{2...m} - \sin\beta_{2...m}) - (\sin\alpha_1 - \sin\beta_1)}{\sin(\omega_{2...m} - \omega_1)}\right| \times \frac{50}{W} < \quad (5)$$

$$2.1 \times 10^{-7} \times \left(\frac{N}{u}\right)^2 + 1.8 \times 10^{-9} \times \left(\frac{N}{u}\right)$$

In Expression (5),

N represents the total number of the input/output ports, and u represents a value of the spot radius which makes a light intensity of $1/e^2$ with respect to the maximum value, which is defined as 1, of the light intensity in the x direction of the deflection elements 106*a* to 106*e*.

The wavelength selective switch according to the seventh embodiment configured as described above is capable of suppressing the ratio of the position shift S to the width W of the deflection elements 106*a* to 106*e* to less than the upper limit value. Therefore, it is possible to provide a wavelength selective switch capable of including at least twenty or more of the input/output ports 101*a* to 101*e* while attaining a desired transmission bandwidth.

EXAMPLES

Next, Examples are described. However, these Examples are each merely an example of the present invention, and the present invention is no way limited thereto.

A second condenser lens 104 of Example 1 was designed based on the data of the following conditions. The second condenser lens 104 had a focal length of 69.98. The second condenser lens 104 had a first surface formed as aspherical surface having a curvature radius of 103.01792, a curvature c of 0.009707 at the surface vertex, a conic coefficient k of −1.000695, and a fourth-order aspherical coefficient $A_2$ of −4.80724E−07. The aspherical surface satisfies the aspherical Expression (2), and has a thickness of 9 at the optical axis center of the lens. E represents an exponential in decimal. For example, "E−07" represents 10 to the negative seventh. Meanwhile, the second surface was a spherical surface with a curvature radius of −100. As a glass base material for the second condenser lens 104, S-LAH66 (manufactured by OHARA INC.) was used.

The design conditions for the aspherical surface of the second condenser lens 104 of Example 1 gives a maximum value of 0.105 in Expression (1), which is less than 0.2. However, this maximum value can be obtained when the range of the height h in the y direction of a light beam passing through the second condenser lens 104 has a maximum value of 5, the range of the height H in the x direction of a light beam passing through the second condenser lens 104 has a maximum value of 5, and the range of the angle ω formed in the y direction between a light beam incident on the second condenser lens 104 and the optical axis of the second condenser lens 104 in the yz plane is 4.1 degrees at maximum.

A second concave mirror 1080 of Example 2 was designed based on the data of the following conditions. The second concave mirror 1080 had a focal length of 70.184. The second concave mirror 1080 had a concave surface formed as aspherical surface having a curvature radius of −140.368, a curvature c of −0.00712 at the surface vertex, a conic coefficient k of 8.420737, and a fourth-order aspherical coefficient $A_2$ of 3.50E−07. The aspherical surface satisfies the aspherical Expression (2).

The design conditions for the aspherical surface of the second concave mirror 1080 of Example 2 gives a maximum value of 0.0008 in Expression (1), which is less than 0.02. However, this maximum value can be obtained when the range of the height h in the y direction of a light beam passing through the second concave mirror 1080 has a maximum value of 5, the range of the height H in the x direction of a light beam passing through the second concave mirror 1080 has a maximum value of 5, and the range of the angle ω formed in the y direction between a light beam incident on the second concave mirror 1080 and the optical axis of the second concave mirror 1080 in the yz plane is 4.1 degrees at maximum.

A Mangin mirror 1101 of Example 3 was designed based on the data of the following conditions. The Mangin mirror 1101 had a focal length of 70. A first surface thereof was formed as a spherical surface having a curvature radius R1 of 222.65. A second surface thereof was formed as a spherical surface having a curvature radius of −450, and had a thickness of 4 at the optical axis center of the lens. As a glass base material for the Mangin mirror 1101, S-LAH66 (manufactured by OHARA INC.) was used.

A Mangin mirror 1101 of Example 4 was designed based on the data of the following conditions. The Mangin mirror 1101 had a focal length of 70. A first surface thereof was formed as an aspherical surface having a curvature radius R1 of 222.65, a curvature c of 0.00449 at the surface vertex, a conic coefficient k of −4.78, a fourth-order aspherical coefficient $A_2$ of −1.873E−08, and a sixth-order aspherical coefficient $A_3$ of −1.066E−10. The aspherical surface satisfies the aspherical Expression (2). A second surface thereof was formed as a spherical surface having a curvature radius of −450, and had a thickness of 4 at the optical axis center of the lens. As a glass base material for the Mangin mirror 1101, S-LAH66 (manufactured by OHARA INC.) was used.

The design conditions for the aspherical surface of the Mangin mirror 1101 of Example 4 gives a maximum value of 0.0028 in Expression (1), which is less than 0.2. However, this maximum value can be obtained when the range of the height h in the y direction of a light beam passing through the Mangin mirror 1101 has a maximum value of 5, the range of the height H in the x direction of a light beam passing through the Mangin mirror 1101 has a maximum value of 5, and the range of the angle ω formed in the y direction between a light beam incident on the Mangin mirror 1101 and the optical axis of the Mangin mirror 1101 in the yz plane is 4.1 degrees at maximum.

A Mangin mirror 1101 of Example 5 was designed based on the data of the following conditions. The Mangin mirror 1101 had a focal length of 70. A first surface thereof was formed as a spherical surface having a curvature radius R1 of 222.65. A second surface thereof was formed as an aspherical surface having a curvature radius of −450, a curvature c of −0.002222 at the surface vertex, a conic coefficient k of −17.0521, a fourth-order aspherical coefficient $A_2$ of 6.55E−09, and a sixth-order aspherical coefficient $A_3$ of 4.605E−11. The aspherical surface satisfies the aspherical Expression (2) and has a thickness of 4 at the optical axis center of the lens. As a glass base material for the Mangin mirror 1101, S-LAH66 (manufactured by OHARA INC.) was used.

The design conditions for the aspherical surface of the Mangin mirror 1101 of Example 5 gives a maximum value of 0.0023 in Expression (1), which is less than 0.02. However, this maximum value can be obtained when the range of the height h in the y direction of a light beam passing through the Mangin mirror 1101 has a maximum value of 5, the range of the height H in the x direction of a light beam passing through the Mangin mirror 1101 has a maximum value of 5, and the range of the angle ω formed in the y direction between a light beam incident on the Mangin mirror 1101 and the optical axis of the Mangin mirror 1101 in the yz plane is 4.1 degrees at maximum.

A Mangin mirror 1101 of Example 6 was designed based on the data of the following conditions. The Mangin mirror 1101 had a focal length of 70. A first surface thereof was formed as a flat surface, and a second surface thereof was formed as a spherical surface having a curvature radius of −460.72, with a thickness of 4 at the optical axis center of the lens. Silicon was used as a glass base material for the Mangin mirror 1101.

A Mangin mirror 1101 of Example 7 was designed based on the data of the following conditions. The Mangin mirror 1101 had a focal length of 70. A first surface thereof was formed as a spherical surface having a curvature radius R1 of 2000, and a second surface thereof was formed as a spherical surface having a curvature radius of −431.4, with a thickness of 4 at the optical axis center of the lens. Aluminum antimonide was used as a glass base material for the Mangin mirror 1101.

A lens of Comparative Example 1 was designed based on the data of the following conditions. The lens has a focal length of 70. A first surface thereof was formed as a spherical surface having a curvature radius R1 of 77.03, and a second surface thereof was formed as a spherical surface having a curvature radius R2 of −153.82, with a thickness of 9 at the optical axis center of the lens. As a glass base material for the lens, S-LAH66 (manufactured by OHARA INC.) was used.

A lens of Comparative Example 2 was designed based on the data of the following conditions. The lens had a focal length of 70, and had a first surface formed as a spherical surface having a curvature radius R1 of −140.

The lenses of Example 1 and Comparative Example 1, the concave mirrors of Example 2 and Comparative Example 2, and the Mangin mirrors 1101 of Examples 3 to 7 were designed, and the sagittal coma aberrations were obtained through simulation.

In order to obtain the sagittal coma aberration, it was assumed that a diaphragm having a diameter of D=2×f×sin (2×θ) was disposed at the front focal point of each of the condenser elements, namely, the lens, the concave mirror, and the Mangin Mirror. Here, f represents a focal length of each of the condenser elements, namely, the lens, the concave mirror, or the Mangin Mirror. θ represents a maximum deflection angle in the x direction of the deflection elements 106a to 106e. In order to obtain the sagittal coma aberration, the first field angle $\omega_1$ is assumed to be an incident angle of a light beam dispersed in a direction of the center of all the dispersion directions by the dispersive portion 105 to be incident on the condenser element, the third field angle $\omega_3$ is assumed to be an incident angle of a light beam dispersed in a direction of the edges of all the dispersion directions by the dispersive portion 105 to be incident on the condenser element, and the second field angle $\omega_2$ is defined as an average angle between the first field angle $\omega_1$ and the third field angle $\omega_3$.

Figure 27:
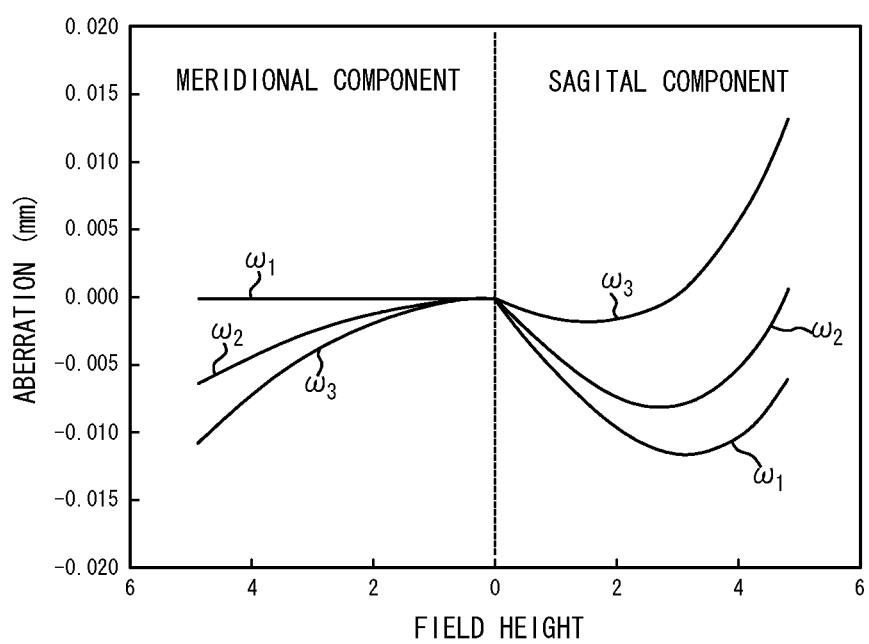
FIG. 27 is a lateral aberration diagram of a sagittal coma aberration in Comparative Example 1.
Figure 28:
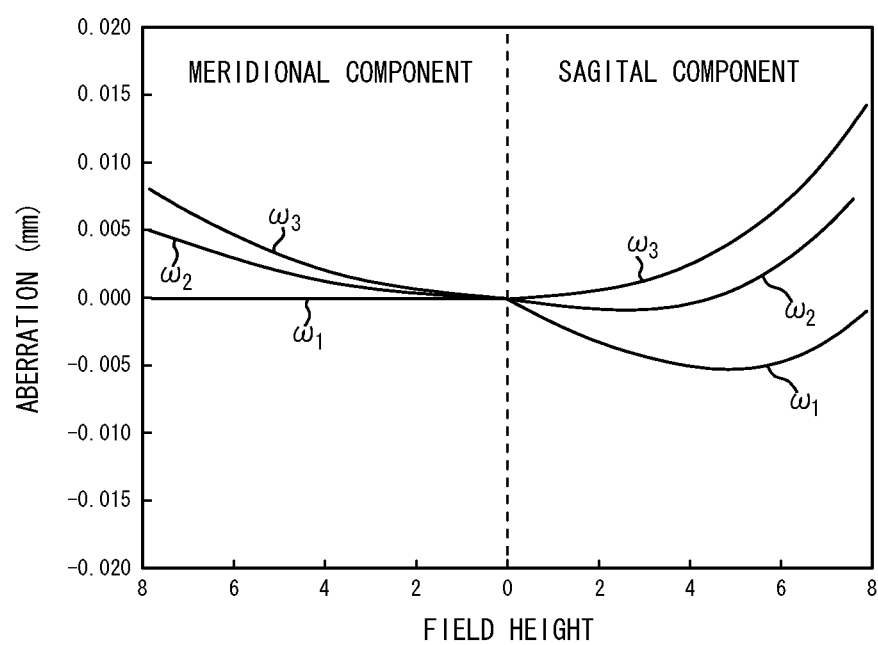
FIG. 28 is a lateral aberration diagram of a sagittal coma aberration in Comparative Example 2.
Figure 29:
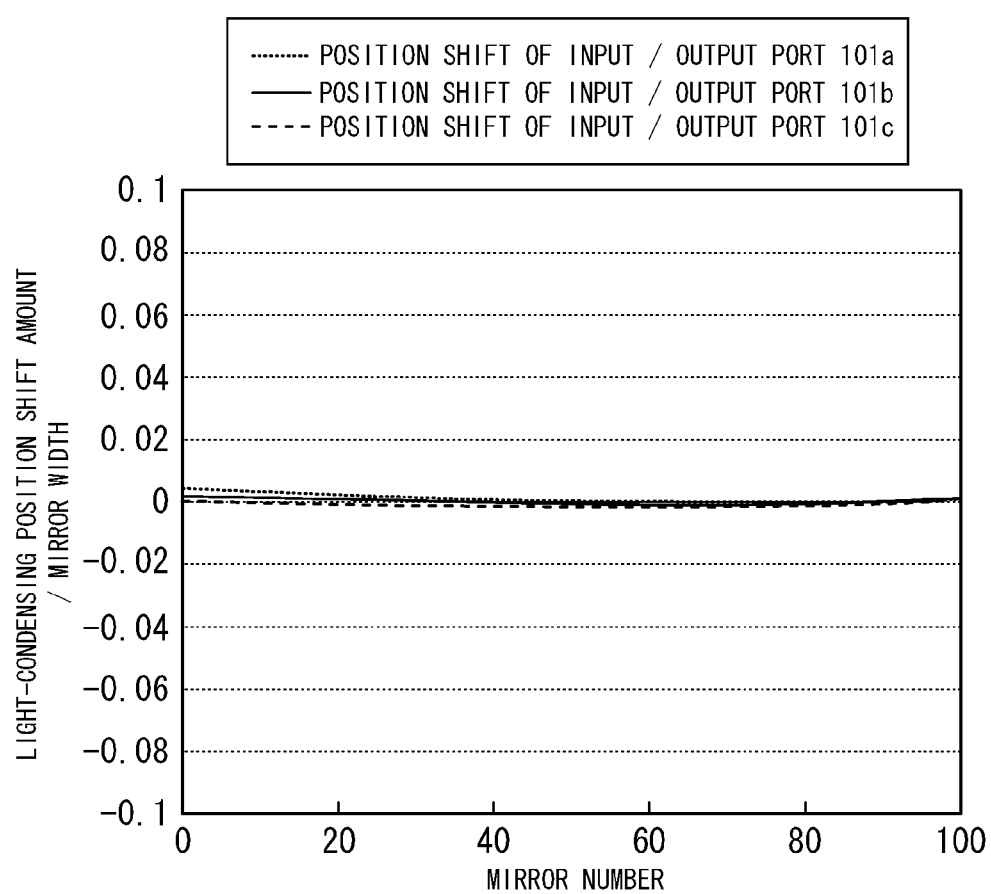
FIG. 29 is a graph showing a relation between the mirror numbers and the ratio (S/W) in the wavelength selective switch of Example 1.
Figure 30:
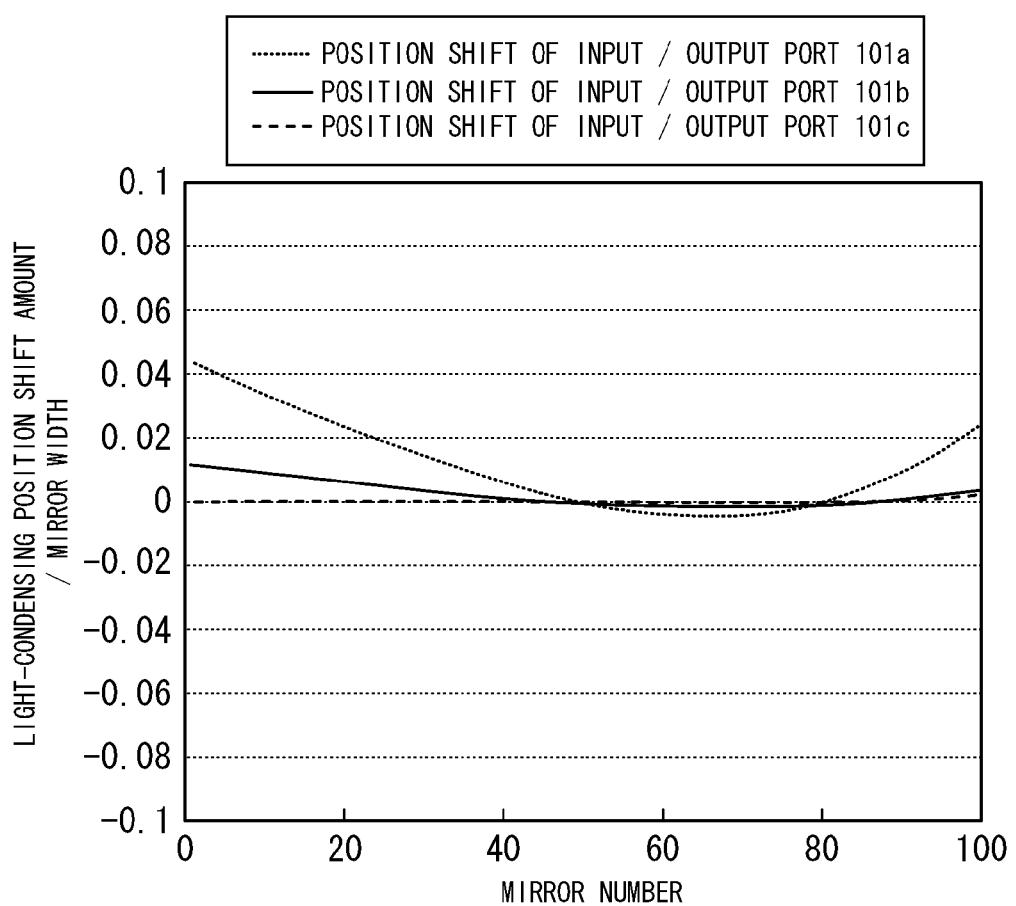
FIG. 30 is a graph showing a relation between the mirror numbers and the ratio (S/W) in the wavelength selective switch of Example 2.

FIGS. 20 to 26 show aberration diagrams of sagittal coma aberrations in Examples 1 to 7. FIGS. 27 and 28 show aberration diagrams of sagittal coma aberrations in Comparative Examples 1 and 2. FIGS. 20 to 28 each show the meridional components in the sagittal coma aberrations for the respective field angles on the left from zero Field Height, while showing the sagittal components in the sagittal coma aberrations on the right from zero Field Height.

Example 1 (FIG. 20) shows that, in comparison with Comparative Example 1 (FIG. 27), with the use of the lens having an aspherical surface formed on one of the surfaces, the aberration amount of the meridional component in a sagittal coma aberration is made substantially zero or substantially constant, irrespective of the magnitude of field angle and Field Height.

Examples 2 to 7 (FIGS. 21 to 26) each show that, in comparison with Comparative Example 2 (FIG. 28), the aberration amount of the meridional component in a sagittal coma aberration is made substantially zero or substantially constant, irrespective of the magnitude of field angle and Field Height, when the reflective surface is formed in an aspherical shape, when a Mangin mirror is employed as the condenser element, or when a high refractive index member is used for forming the medium of the Mangin mirror.

A comparison among Examples 3 to 5 (FIGS. 22 to 24) shows that the aberration amount of the meridional component in a sagittal coma aberration is further smaller in variation with respect to the field angle and Field Height, with the use of a Mangin mirror having either one of the reflective surface or the transmission surface formed as an aspherical surface, rather than with the use of a Mangin mirror having both surfaces formed as spherical surfaces.

Next, as the second condenser lens 104 of the first embodiment, a wavelength selective switch employing the lenses of Example 1 and Comparative Example 1 was designed. As the second concave mirror 1080 of the second embodiment, a wavelength selective switch employing the concave mirrors of Example 2 and of Comparative Example 2 was designed. As the Mangin mirror 1101 of the third embodiment, a wavelength selective switch employing the Mangin mirrors of Examples 3 to 5 was designed. Then, the ratio (S/W) of the position shift S to the width W of the deflection elements 106a to 106e in each of the wavelength selective switches was obtained.

Figure 34:
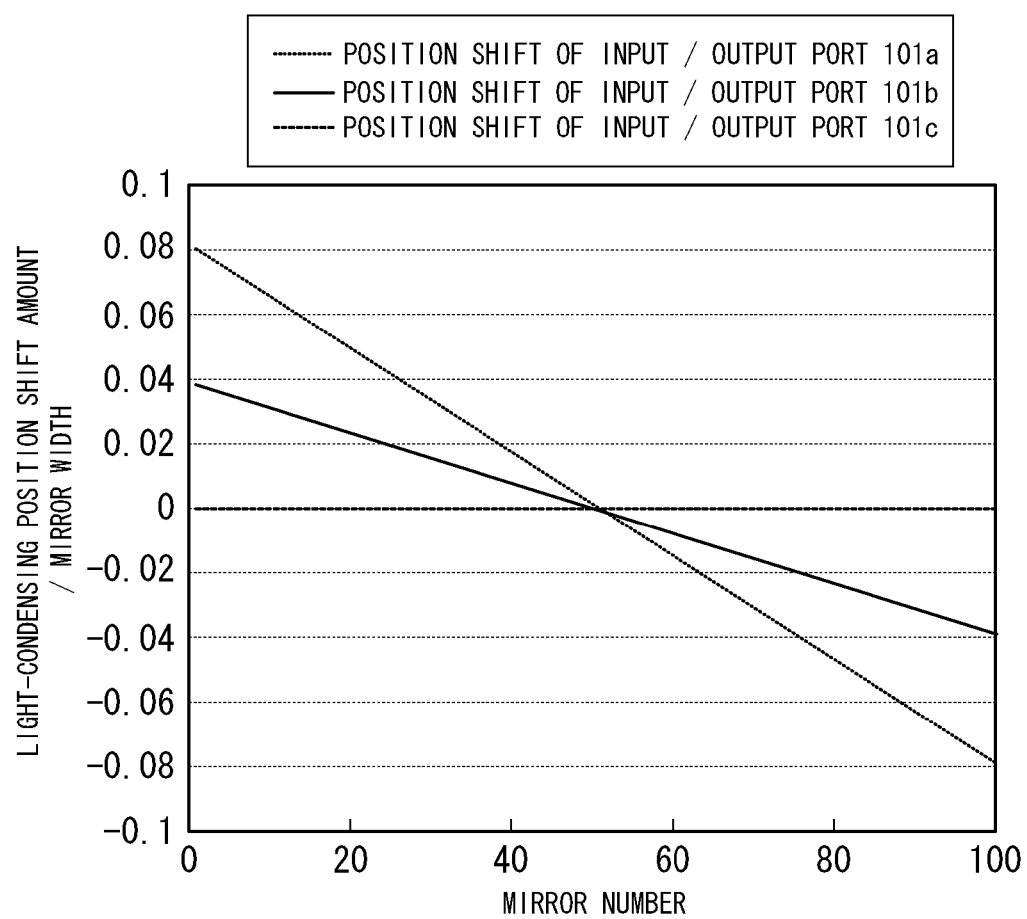
FIG. 34 is a graph showing a relation between the mirror numbers and the ratio (S/W) in the wavelength selective switch of Comparative Example 1.
Figure 35:
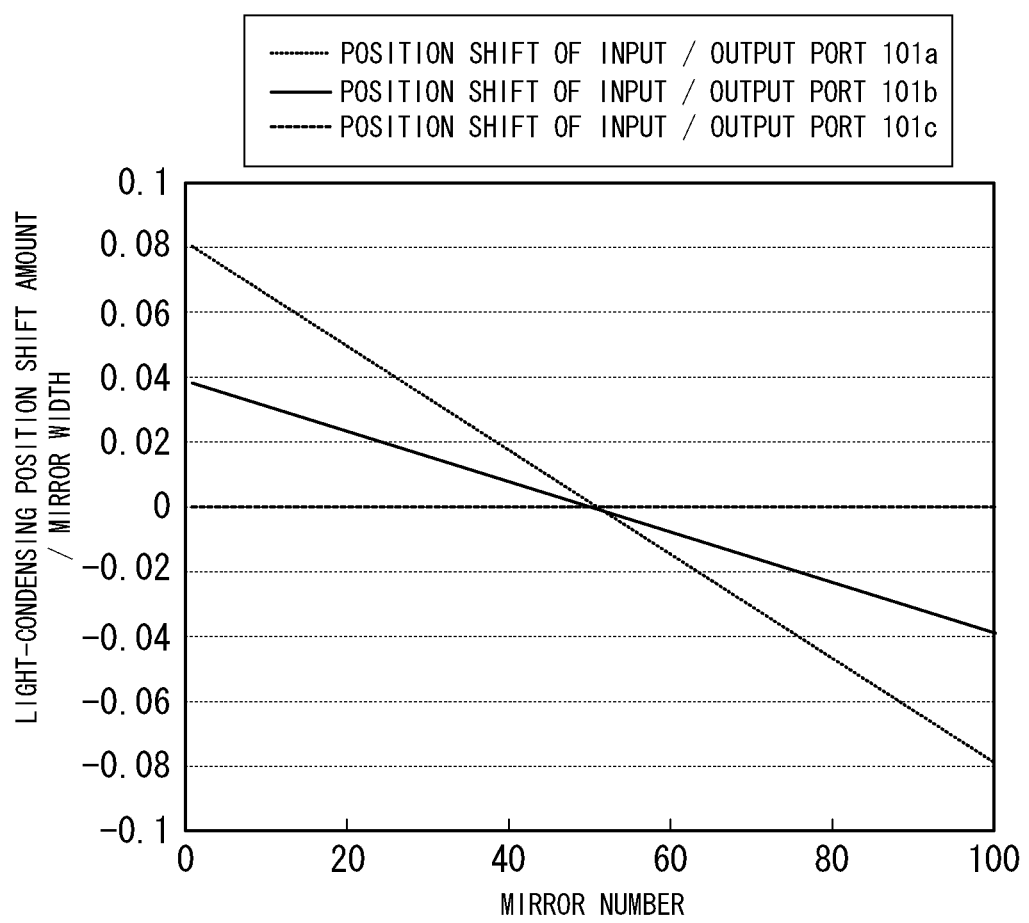
FIG. 35 is a graph showing a relation between the mirror numbers and the ratio (S/W) in the wavelength selective switch of Comparative Example 2.

FIGS. 29 to 33 are graphs each showing a relation between the ratio of the position shift S to the width W and the mirror numbers, i.e., the numbers assigned to the deflection elements, which are aligned along the y direction, from one end to the other end, in each of the wavelength selective switches of Examples 1 to 5. FIGS. 34 and 35 are graphs each showing a relation between the ratio of the position shift S to the width W and the mirror numbers, i.e., the numbers assigned to the deflection elements, which are aligned along the y direction, from one end to the other end, in each of the wavelength selective switches of Comparative Examples 1 and 2.

Here, the relation between the mirror numbers and the ratio of the position shift S varies depending on the position of the input/output ports 101a to 101e along the x direction. In view of this, the relation was obtained for each of the input/output port 101c which was in line with the optical axis of the condenser element in the xz plane, for the input/output port 101b next thereto, and for the input/output port 101 second next thereto, respectively.

FIGS. 34 and 35 show that, as the distance from the optical axis of the condenser element to the position of the input/output port along the x direction increases, the absolute value of the ratio (S/W) becomes larger. In particular, the absolute value becomes larger when the mirror number deviates from 50, which is the number in the middle. In both of Comparative Examples 1 and 2, the ratio (S/W) may exceed the upper limit value of 0.07.

On the other hand, as shown in FIGS. 29 to 33, in any of Examples 1 to 5, the ratio (S/W) does not exceed the upper limit value of 0.07. Accordingly, the upper limit of the number of the input/output ports that can be provided without affecting the transmission band is larger as compared to Comparative Examples 1 and 2. Therefore, the configurations of Examples 1 to 5 are each capable of allowing the wavelength selective switch to include a larger number of input/output ports without affecting the transmission band, as compared to Comparative Examples 1 and 2.

Figure 31:
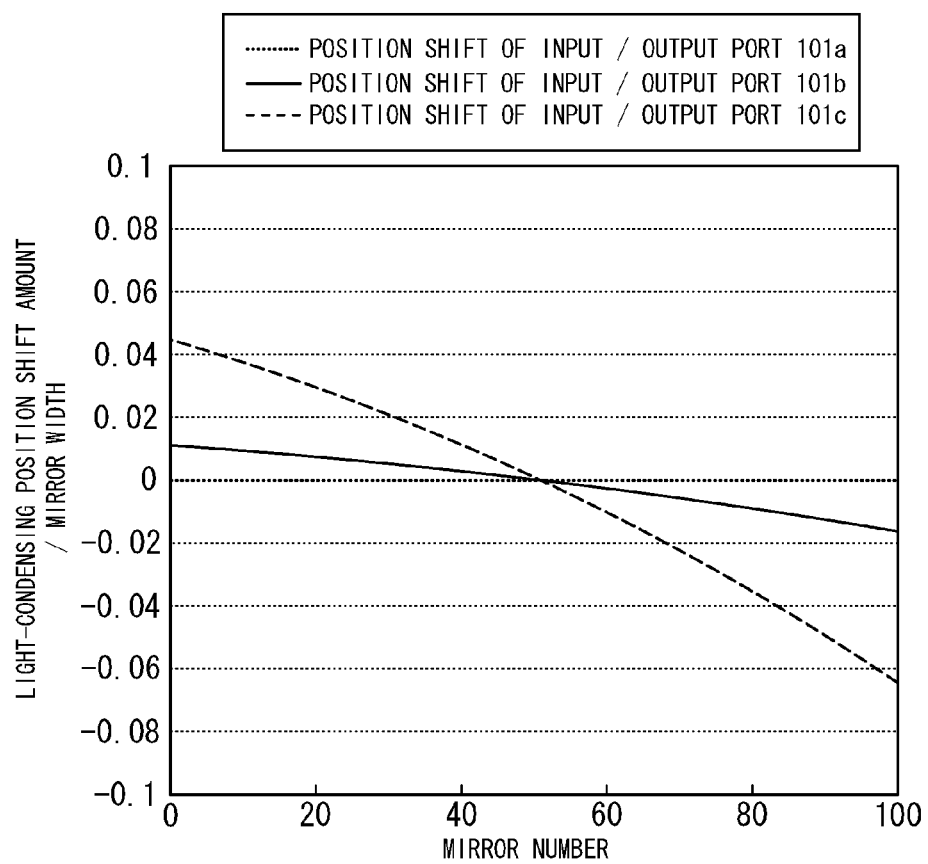
FIG. 31 is a graph showing a relation between the mirror numbers and the ratio (S/W) in the wavelength selective switch of Example 3.
Figure 32:
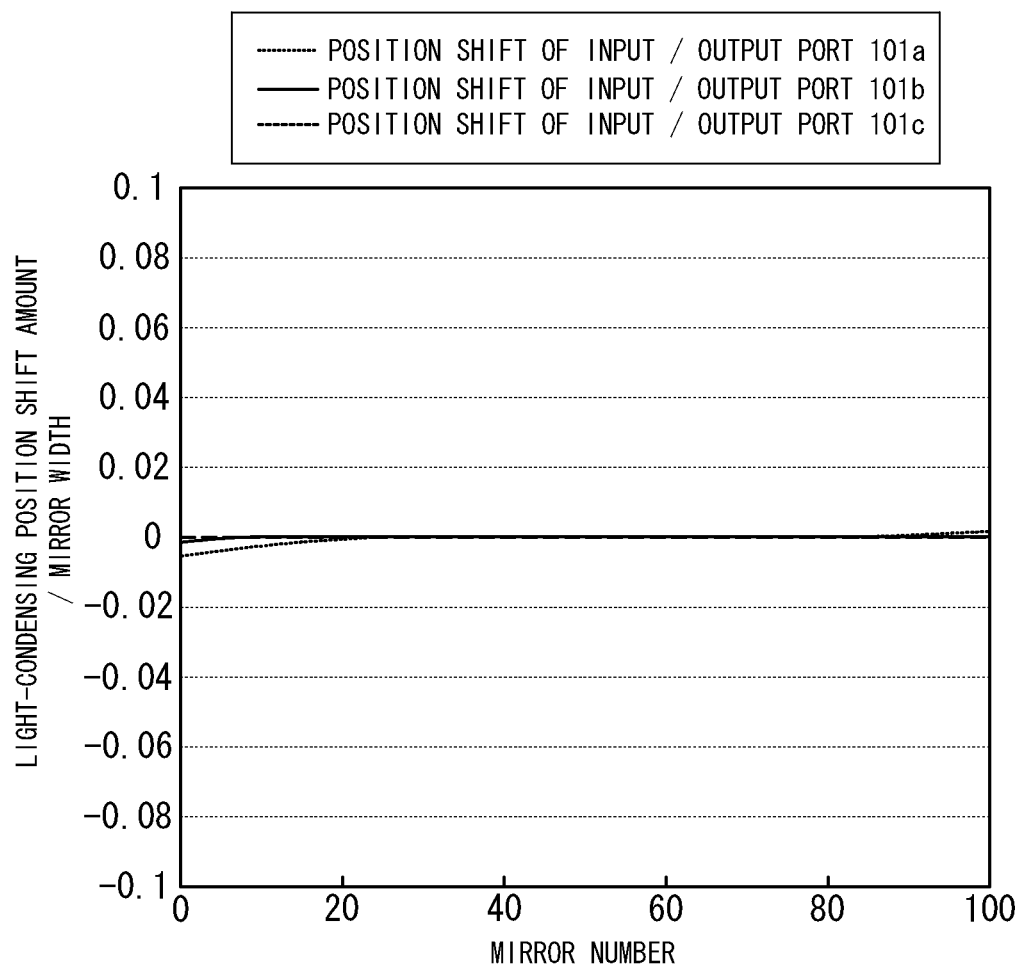
FIG. 32 is a graph showing a relation between the mirror numbers and the ratio (S/W) in the wavelength selective switch of Example 4.
Figure 33:
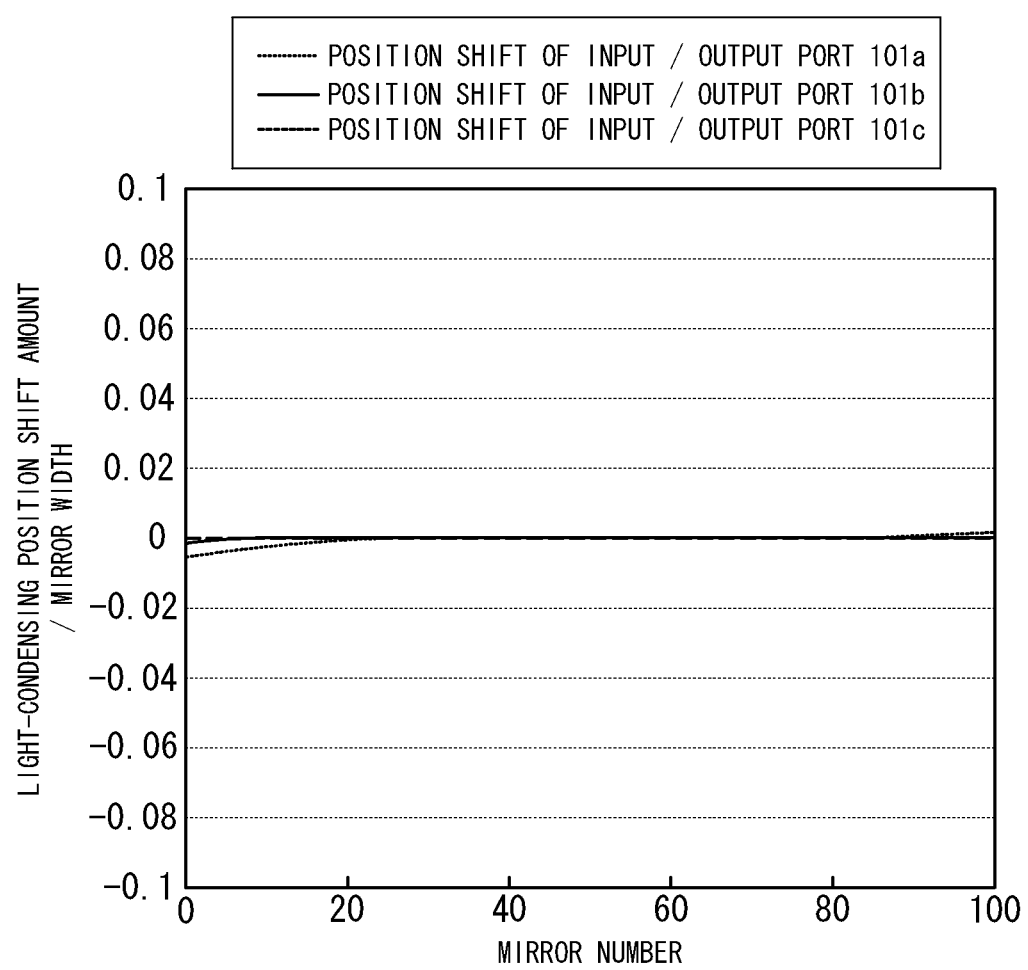
FIG. 33 is a graph showing a relation between the mirror numbers and the ratio (S/W) in the wavelength selective switch of Example 5.

Further, FIGS. 32 and 33 show that, in comparison with FIG. 31, the ratio (S/W) becomes smaller with the use of a Mangin mirror having either one of the transmission surface or the reflective surface formed as an aspherical surface, rather than with a Mangin mirror having both surfaces formed in spherical surfaces. Therefore, the configurations of Examples 4 and 5 are each capable of allowing the wavelength selective switch to include a further larger number of input/output ports without affecting the transmission band, as compared to Example 3.

A certain aspect of the present invention has been described with reference to the drawings and embodiments. However, it should be noted various alterations and modifications may be readily made thereto by a person skilled in the art, based on the present disclosure, and therefore those alterations and modifications still fall within the scope of the present invention.

For example, the second condenser lens 104 of the first embodiment and the second concave mirror 1080 of the second embodiment are each configured so that the conditions to be satisfied by the aspherical shape are defined by using Expression (1). However, the second condenser lens 104 and the second concave mirror 1080 may also be configured without satisfying such a conditional expression. The conditions defined by using Expression (1) need not to be satisfied as long as the optical element has a condensing function and makes substantially constant the aberration amount of the meridional component in a sagittal coma aberration irrespective of the angle ω formed by a light beam incident on the optical element at an incident position at a certain height in the x direction.

Further, the second condenser lens 104 and the second concave mirror 1080, which are each formed in an aspherical shapes in the first embodiment and in the second embodiment, respectively, each may be an anamorphic optical element having different curvature radii in the x direction and the y direction, or a free-form surface optical element. Any optical element may be employed as long as the optical element has a condensing function and makes substantially constant the aberration amount of the meridional component in a sagittal coma aberration irrespective of the angle ω formed by a light beam incident on the optical element at an incident position at a certain height in the x direction.

Further, in the first embodiment, the transmission surface of the second condenser lens 104 is configured as an aspherical surface that is supposed to give a maximum value of less than 0.2 in Expression (1). However, the present invention is not limited thereto. The aberration amount of the meridional component in a sagittal coma aberration can still be made substantially constant irrespective of the angle ω, as long as the condensing optical system for condensing signal light beams dispersed by the dispersive portion 105 includes an optical element having a transmission surface, and the transmission surface of the optical element is in an aspherical shape that gives a maximum value of less than 0.2 in Expression (1).

Further, in the second embodiment, the reflective surface of the second concave mirror 1080 is configured as an aspherical surface that is supposed to give a maximum value of less than 0.02 in Expression (1). However, the present invention is not limited thereto. The aberration amount of the meridional component in a sagittal coma aberration can still be made substantially constant irrespective of the angle ω, as long as the condensing optical system for condensing signal light beams dispersed by the dispersive portion 105 includes an optical element having a reflective surface and the reflective surface of the optical element is in an aspherical shape that gives a maximum value of less than 0.02 in Expression (1).

Further, in the sixth embodiment, the Mangin mirror 1101 is formed by using silicon (having a refractive index of 3.4). However, the high refractive index member is not limited to silicon. Examples of the high refractive index member may include: gallium arsenide (having a refractive index of 3.4); aluminum arsenide (having a refractive index of 3.3); gallium phosphide (having a refractive index of 3.1); and aluminum antimonide (having a refractive index of 2.8). Further, the high refractive index member is not limited thereto, and the above-mentioned effect can still be obtained with the use of any member having a refractive index of 2.8 or more in a 1.5 micron bandwidth, in which the wavelength selective switch is used.

It should be noted that the use of a high refractive index member as the medium of the Mangin mirror is not the only way to increase the curvature radius of one of the surfaces of the Mangin mirror 1101 of the sixth embodiment. For example, the curvature radius may be increased by using a Grin lens, or by forming at least one surface of the Mangin mirror 1101 in a Fresnel shape.

Further, the first embodiment is configured without limiting a member for forming the second condenser lens 104. However, as in the fourth embodiment, a high refractive index member may be used to thereby further reduce the aberration amount of the meridional component in a sagittal coma aberration.

Further, in each of the first to seventh embodiments, the condenser element for condensing signal light dispersed by the dispersive portion 105 includes: a single condenser lens; a single concave mirror; or a single Mangin mirror. However, a condensing optical system using a plurality of optical elements may also be employed.

Figure 36:
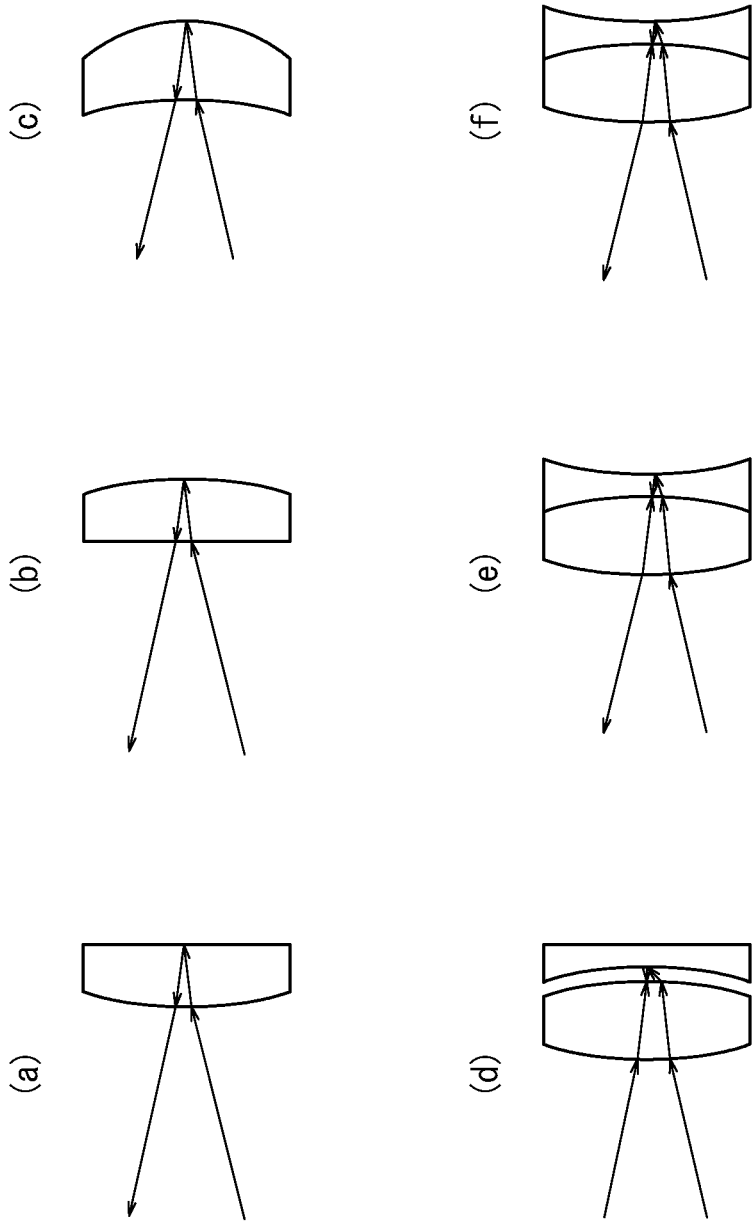
FIGS. 36A to 36F are side views illustrating various Mangin mirrors that are applicable to the third embodiment.

For example, as the Mangin mirror in the third embodiment, a single optical element having various surface shapes as illustrated in FIG. 36 may be employed (see FIGS. 36A to 36C), or a combination of a plurality of optical elements may be employed as the Mangin mirror (see FIGS. 36D to 36F).

Further, the first to seventh embodiments each include at least twenty of the input/output ports. However, the number of the input/output ports to be provided may be increased to, for example, 30, 40, and 50 or more as long as the conditions in each embodiment are satisfied.

DESCRIPTION OF SYMBOLS

100, 1000, 1001, 100' wavelength selective switch
101, 101' input/output unit
101a to 101e, 101a' to 101e' input/output port
102, 102' the micro lens array
103, 103' first condenser lens
104, 104' second condenser lens
105, 105' dispersive portion
106, 106' deflection portion
106a to 106e, 106a' to 106e' deflection element
1070 first concave mirror
1080, 1082 second concave mirror
1090 deflection prism
1101 Mangin mirror
1101r reflective surface
1101t transmission surface
CF sagittal coma flare
PCP primary condensing point

The invention claimed is:

1. A wavelength selective switch, comprising:
an input/output portion including at least twenty input/output ports;
a dispersive portion for dispersing wavelength-multiplexed signal light incident from the input/output port;
a condensing optical system for condensing a plurality of signal light beams dispersed by the dispersive portion; and
a deflection portion having a plurality of deflection elements for deflecting, along a second direction perpendicular to the dispersion direction of the dispersive portion, the plurality of signal light beams condensed by the condensing optical system, so as to allow the signal light beams to be incident on any of the input/output ports,
the condensing optical system having the aberration amount of the meridional component in a sagittal coma aberration maintained substantially constant irrespective of an angle formed between the optical axis of the condensing optical system and the signal light beam incident on the condensing optical system from the input/output portion, at an incident position of the incident signal light beam at a certain height in the second direction.

2. The wavelength selective switch according to claim 1, wherein the condensing optical system has a curved surface in an aspherical shape in the dispersion direction.

3. The wavelength selective switch according to claim 2, wherein the curved surface is a reflective surface,
wherein $Z_{asp}(h)$ is an amount of sag of the aspherical shape, which is obtained by Expression (1):

$$Z_{asp}(h) = \frac{c \times h^2}{1 + \sqrt{1-(1+k) \times c^2 \times h^2}} + \sum_{i=2} A_i h^{2i}, \quad (1)$$

where c represents a curvature, k represents a conic coefficient, and $A_i$ (i is an integer of 2 or more) represents an aspherical coefficient of 2i-th order,
wherein $Z_{sp}(h)$ represents an amount of sag of a spherical shape that is paraxial to the aspherical shape, which is obtained by Expression (2):

$$Z_{sp}(h) = \frac{c \times h^2}{1 + \sqrt{1-c^2 \times h^2}}, \quad (2)$$

wherein Expression (3) has a maximum value of less than 0.02:

$$\left| \left( \frac{Z_{asp}(h)}{Z_{sp}(h)} - 1 \right) \times \frac{f}{H\omega} \right|, \quad (3)$$

where f represents the focal length of the condensing optical system, H represents a distance from each of the signal light beams passing through the condensing optical system to the optical axis of the condensing optical system, relative to the second direction, ω represents an angle formed between a light beam passing through the condensing optical system and the optical axis of the condensing optical system in the dispersion direction.

4. The wavelength selective switch according to claim 2, wherein the curved surface is a transmission surface,
wherein $Z_{asp}(h)$ represents an amount of sag of the aspherical shape, which is obtained by expression (4):

$$Z_{asp}(h) = \frac{c \times h^2}{1 + \sqrt{1-(1+k) \times c^2 \times h^2}} + \sum_{i=2} A_i h^{2i}, \quad (4)$$

where c represents a curvature, k represents a conic coefficient, and $A_i$ (i is an integer of 2 or more) represents an aspherical coefficient of 2i-th order,
wherein $Z_{sp}(h)$ represents an amount of sag of a spherical shape that is paraxial to the aspherical shape, which is obtained by Expression (5):

$$Z_{sp}(h) = \frac{c \times h^2}{1 + \sqrt{1-c^2 \times h^2}}, \quad (5)$$

wherein Expression (6) has a maximum value of less than 0.2:

$$\left| \left( \frac{Z_{asp}(h)}{Z_{sp}(h)} - 1 \right) \times \frac{f}{H\omega} \right|, \quad (6)$$

where f is the focal length of the condensing optical system, H is a distance from each of the signal light beams passing through the condensing optical system to the optical axis of the condensing optical system, relative to the second direction, ω is an angle formed between a light beam passing through the condensing optical system and the optical axis of the condensing optical system in the dispersion direction.

5. The wavelength selective switch according to claim 2, wherein the condensing optical system includes a mirror having the curved surface.

6. The wavelength selective switch according to claim 2, wherein the condensing optical system includes, as an optical element, a lens having the curved surface.

7. The wavelength selective switch according to claim 6, wherein the optical element having the curved surface has a refractive index of 2.8 or more, and includes a medium for transmitting the signal light beams.

8. The wavelength selective switch according to claim 7, wherein the medium of the optical system is any one of silicon, gallium arsenide, aluminum arsenide, gallium phosphide, and aluminum antimonide.

9. The wavelength selective switch according to claim 6, wherein the optical element having the curved surface is a Grin lens.

10. The wavelength selective switch according to claim 6, wherein the optical element having the curved surface has a surface formed in a Fresnel shape.

11. The wavelength selective switch according to claim 1, wherein the condensing optical system has a curved surface which is a free-form surface.

12. The wavelength selective switch according to claim 1,
wherein the condensing optical system includes an optical element, the optical element having an incident surface for receiving the signal light beams incident thereon and a curved surface for reflecting the signal light beams incident on the incident surface, and the optical element refracting the signal light beams to be transmitted from the incident surface to the reflective surface.

13. The wavelength selective switch according to claim 1, wherein the condensing optical system has a curved surface discontinuous in the second direction.

14. The wavelength selective switch according to claim 1,
wherein, assuming that a diaphragm is disposed on a front focal position of the condensing optical system, the diaphragm being in a size equal to a distance D between the passage positions of two light beams passing through both ends of the dispersive portion in the second direction, among the light beams passing through the twenty input/output ports, the maximum field angle $\omega$ is represented by Expression (7), with the total dispersion angle being defined as $\gamma$ with respect to the wavelength range of the dispersive portion:

$$|\pm \omega| = \frac{\gamma}{2} \quad (7)$$

wherein Expression (8) or Expression (9) is satisfied:

$$\left| \frac{(\sin\alpha_{2\ldots m} - \sin\beta_{2\ldots m}) - (\sin\alpha_1 - \sin\beta_1)}{\sin(\omega_{2\ldots m} - \omega_1)} \right| \times \frac{50}{W} < 0.003 \quad (8)$$

$$\left| \frac{(\sin\alpha_{2\ldots m} - \sin\beta_{2\ldots m}) - (\sin\alpha_1 - \sin\beta_1)}{\sin(\omega_{2\ldots m} - \omega_1)} \right| \times \frac{50}{W} < \quad (9)$$

$$2.1 \times 10^{-7} \times \left(\frac{N}{u}\right)^2 + 1.8 \times 10^{-9} \times \left(\frac{N}{u}\right)$$

where $\omega_1$ represents a minimum field angle, $\omega_{2\ldots m}$ represents an arbitrary field angle in a range from the maximum field angle $\omega$ to the minimum field angle $\omega_1$, $\alpha_1$ represents an incident angle of a light beam passing through the center in the dispersion direction of the diaphragm at a position of the diaphragm when the field angle is $\omega_1$, $\beta_1$ is an incident angle, relative to the dispersion direction on the deflection elements, of a light beam passing through an arbitrary height H within a range of the size D of the diaphragm in the dispersion direction at the position of the diaphragm when the field angle is $\omega_1$, $\alpha_{2\ldots m}$ represents an incident angle, relative to the dispersion direction on the deflection elements, of a light beam passing through the center of the diaphragm in the dispersion direction at a position of the diaphragm when the field angle is $\omega_{2\ldots m}$, $\beta_{2\ldots m}$ represents an incident angle, relative to the dispersion direction on the deflection elements, of a light beam passing through the height H in the dispersion direction at a position of the diaphragm when the field angle is $\omega_{2\ldots m}$, the frequency interval of the deflection elements is W(GHz), N represents a total number of the input/output ports, and u represents a value of a spot radius which makes a light intensity of $1/e^2$ with respect to the maximum value, which is defined as 1, of the light intensity in the second direction of the deflection elements.

\* \* \* \* \*